US012365569B2

(12) United States Patent
Taylor et al.

(10) Patent No.: US 12,365,569 B2
(45) Date of Patent: Jul. 22, 2025

(54) INTELLIGENT VEHICLE LIFT NETWORK WITH DISTRIBUTED SENSORS

(71) Applicant: Vehicle Service Group, LLC, Madison, IN (US)

(72) Inventors: Steven H. Taylor, Hanover, IN (US); Robert William Elliott, Madison, IN (US); Gerry Lauderbaugh, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 0 days.

(21) Appl. No.: 19/039,405

(22) Filed: Jan. 28, 2025

(65) Prior Publication Data

US 2025/0171284 A1 May 29, 2025

Related U.S. Application Data

(62) Division of application No. 17/289,388, filed as application No. PCT/US2019/060750 on Nov. 11, 2019, now Pat. No. 12,227,400.

(60) Provisional application No. 62/758,279, filed on Nov. 9, 2018.

(51) Int. Cl.
*B66F 7/28* (2006.01)
*B66F 7/20* (2006.01)
*G06N 20/00* (2019.01)
*G06T 7/70* (2017.01)
*G06V 20/10* (2022.01)
*H04L 67/12* (2022.01)

(52) U.S. Cl.
CPC ................. *B66F 7/28* (2013.01); *B66F 7/20* (2013.01); *G06N 20/00* (2019.01); *G06T 7/70* (2017.01); *G06V 20/10* (2022.01); *H04L 67/12* (2013.01); *G06T 2207/30252* (2013.01); *G06V 2201/08* (2022.01)

(58) Field of Classification Search
CPC ........................................... G06T 2207/30252
See application file for complete search history.

(56) References Cited

U.S. PATENT DOCUMENTS

| | | | | |
|---|---|---|---|---|
| 9,376,296 | B2 * | 6/2016 | Nussbaum | B66F 7/20 |
| 2006/0114531 | A1 * | 6/2006 | Webb | G01N 21/8851 359/15 |
| 2018/0339890 | A1 * | 11/2018 | Perlstein | B66F 3/46 |
| 2020/0223675 | A1 * | 7/2020 | Wen | B66F 9/063 |

* cited by examiner

*Primary Examiner* — Wassim Mahrouka
(74) *Attorney, Agent, or Firm* — Frost Brown Todd LLP

(57) ABSTRACT

An automation system uses cameras and sensors to identify a set of vehicle wheels within a lift area, then virtualizes the position and orientation of the vehicle relative to the lift posts. Lift arms extending from the lift posts are moved to a first position that places a profile camera near the predicted position of lift points, and image analysis is used to positively identify the lift points. The lift arms are then moved to a second position that places an adapter camera below the identified lift points, and image analysis is used to confirm safe positioning below the lift point. Captured images and feedback from image analysis are used to improve and refine the system's ability to identify wheels, profile view lift points, and plan view lift points. The system may be integrated with lift arms allowing for automated rotation, extension, and elevation of lift adapters.

20 Claims, 32 Drawing Sheets

INTELLIGENT VEHICLE LIFT NETWORK WITH DISTRIBUTED SENSORS

REFERENCE TO RELATED APPLICATIONS

This application is a divisional of and claims the benefit of U.S. application Ser. No. 17/289,388, filed Apr. 28, 2021, entitled "Intelligent Vehicle Lift Network with Distributed Sensors," which claims the benefit of PCT App. No. PCT/US19/60750, filed Nov. 11, 2019, entitled "Intelligent Vehicle Lift Network with Distributed Sensors," and U.S. Provisional Pat. App. No. 62/758,279, filed Nov. 9, 2018, entitled "Intelligent Vehicle Lift Network with Distributed Sensors," the disclosures of each of which are incorporated by reference herein.

FIELD

The disclosed technology pertains to a system for automatically positioning a vehicle lift.

BACKGROUND

Lifting vehicles during service can be a time-consuming, labor-intensive, and dangerous process. Vehicle lifts have varying designs and capabilities, including drive-on or in-ground lifts that lift a parked vehicle by raising the parking surface in order to allow access to the underside of the vehicle, as well as frame engaging lifts that raise a vehicle by contacting structural lifting points on the underside frame of the vehicle, which allow access to the underside of the vehicle as well as allowing wheels and tires to be removed or serviced.

Since vehicle service often includes removing or inspecting tires and wheels, frame engaging lifts are a popular option. Two-post lifts are a popular type of frame-engaging lift, and generally have a post positioned on each side of a vehicle area, as well as a lifting member that can be vertically raised and lowered along each lift post. To allow for compatibility with a variety of vehicles, lifting members will typically have a number of adjustable features that allow the lifting members to reach and engage with vehicle lift points in a variety of locations on a vehicle within the vehicle area.

For example, many passenger vehicles have a set of four outer lift points located on the vehicle frame below the doors, and many passenger vehicles may have an additional set of four inner lift points located at structural points (e.g., a rigid bracket, arm, or joint of the frame as opposed to a component of the transmission, engine, exhaust, or suspension) closer to the midline of the vehicle. These lift points may be at different heights and locations to accommodate vehicles of different heights and lengths (e.g., lift points will be spread further apart on a truck or bus as compared to a compact car, and some trucks or sport utility vehicles may have lift points at a higher elevation than those of a sports car or compact car).

As a result, the process of lifting a vehicle often includes positioning the vehicle within the vehicle area, moving lift arms underneath the vehicle, repeatedly visually verifying the locations of the lift points and manually adjusting the lifting members (e.g., by pushing or pulling, or in some cases, by electronic control) until contact is made, and then slowly raising the lifting members while a spotter visually ensures that engagement with the lift points is maintained and that the vehicle does not shift or settle as it raises.

This process can be time-consuming (e.g., requiring repeated adjustment and visual confirmation) or labor-intensive (e.g., requiring one or more visual spotters as well as a lift controller, may require personnel to lie prone to visually spot or position lifting members under the vehicle at ground level), and may be dangerous (e.g., miscommunication between visual spotters and controllers may lead to personnel being struck by the vehicle or lift).

What is needed, therefore, is an improved lifting member and a system and method for positioning the lifting member relative to the lifting points of a vehicle.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of automatic vehicle lifts. While the disclosed applications of the inventors' technology satisfy a long-felt but unmet need in the art of automatic vehicle lifts, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only and should not be treated as limiting.

I. Exemplary Lift Automation System

Figure 1:
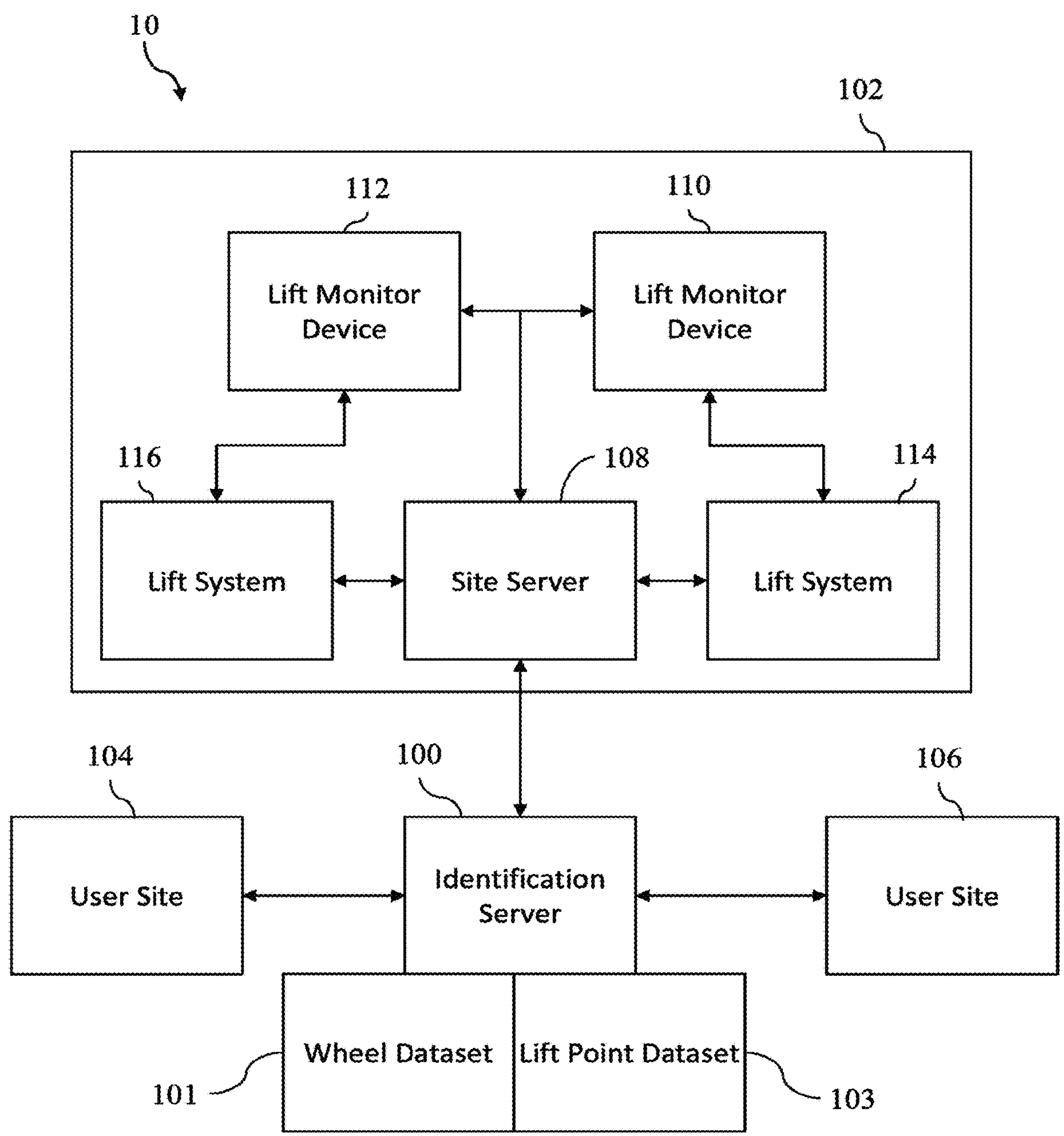
FIG. 1 is a schematic diagram of an exemplary lift automation system.

Turning now to the figures, FIG. 1 shows a schematic diagram of an exemplary lift automation system (10). The lift automation system (10) comprises an identification server (100) that is in communication with one or more user sites (102, 104, 106). A user site, such as the user site (102), may be a user location or installation such as a vehicle service garage capable of servicing one or more vehicles. The user site (102) may comprise a site server (108) that is in communication with the identification server (100), and one or more lift systems (114, 116) and lift monitor devices (110, 112). A user of the lift automation system (10) may have one or more user sites such as the user site (102) (e.g., separate buildings each capable of servicing one or more vehicles), or may have a single user site such as the user site (102) that is spread across separate buildings (e.g., a particular user may have a single site server (108) that is in communication with lift systems (114, 116) that are located in different buildings).

The identification server (100) may be one or more physical or virtual servers or server environments capable of storing, processing, and transmitting various types of information via the internet or another network. The identification server (100) stores or is in communication with other servers or databases that are configured to store a wheel dataset (101), comprising data in various forms that may be used to aid in the automatic detection and identification of vehicle wheels, and a lift point dataset (103), comprising data in various forms that may be used to aid in the automatic detection and identification of vehicle lift points, as will be discussed in more detail below.

The site server (108) may be one or more physical or virtual servers or server environments capable of storing, processing, and transmitting information via the internet or another network, and may also be in communication with one or more lift systems (114, 116) and one or more lift monitor devices (110, 112). The site server (108) may store sets and subsets of information from the wheel dataset (101) and the lift point dataset (103) that it receives via the identification server (100) or another device, and may also provide site performance information to the identification server (100) to allow for the growth and refinement of the wheel dataset (101) and the lift point dataset (103), as will be discussed in more detail below.

The lift system (114, 116) may be any of a variety of vehicle lifts that are compatible with and may benefit from automatic positioning of lifting members at vehicle lift points. The lift monitor device (110, 112) may be, for example, a smartphone, tablet, laptop computer, desktop computer, kiosk device, or other proprietary device capable of displaying information, receiving user inputs, processing and storing information, and communicating with other devices. The lift monitor device (110) is in communication with the lift system (114) and allows a user of the lift monitor device (110) to view information (e.g., textual information describing the lift as well as visual data associated with the lift), interact with, and control the lift system (114), as will be described in more detail below.

Variations on lift automation system (10) shown in FIG. 1 exist and will be apparent to one of ordinary skill in the art in light of this disclosure. For example, in some implementations, identification server (100) and site server (108) may be the same server or environment, or identification server (100) may communicate directly with the lift system (114, 116) and the lift monitor device (110, 112). In some implementations, site server (108), lift monitor device (110, 112), or both may be components of (e.g., integrated with or connected to in a one-to-one correspondence) the lift system (114, 116). Further, it should be understood that the user site (104) and the user site (106) may be substantially similar to the user site (102), and that each may have one or more lift systems (114, 116).

Figure 2:
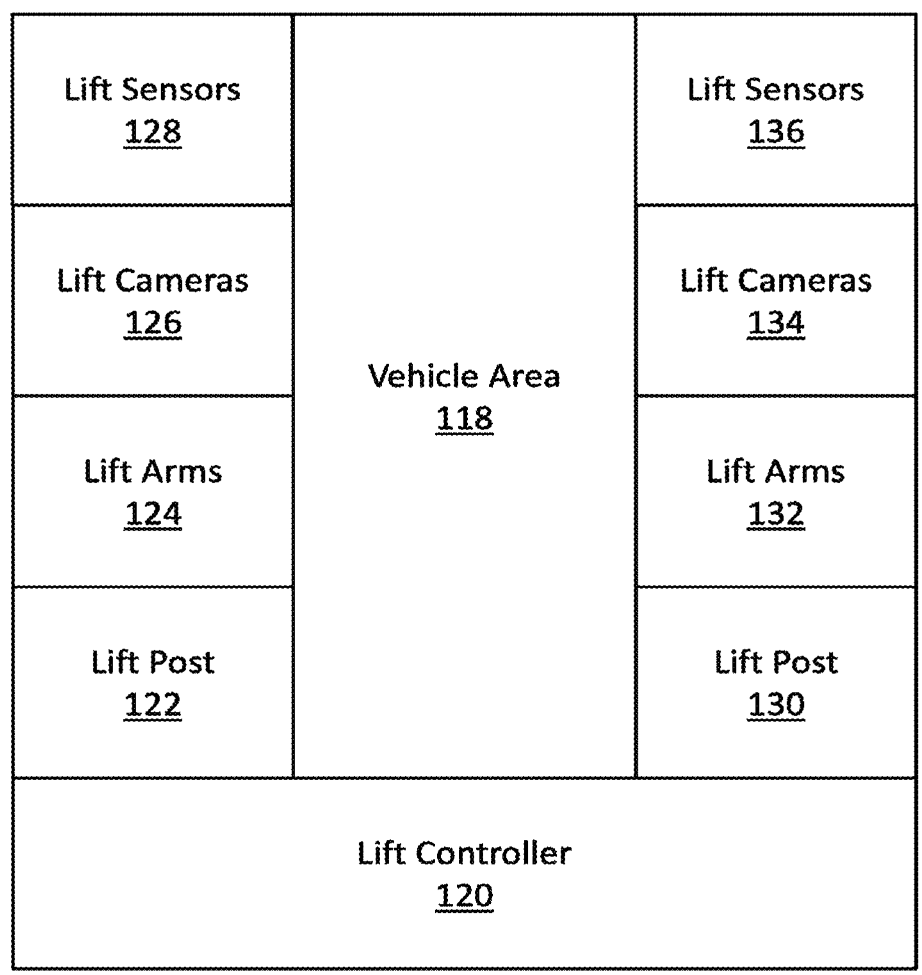
FIG. 2 is a schematic diagram of an exemplary vehicle lift system usable with the lift automation system.

To provide more information on lift systems, FIG. 2 shows a schematic diagram of an exemplary vehicle lift system, such as the lift system (114), that is usable with the lift automation system (10). The lift system (114) comprises a vehicle area in which a vehicle may be positioned in order to be interacted with by the lift system (114). While the disclosed technology could function with a variety of vehicle lifts, for the sake of clarity and discussion, this disclosure will focus on describing two-post, frame-engaging vehicle lifts (e.g., lifts having lifting members that contact multiple lift points on a vehicle's frame, and lift the vehicle from a resting point in the vehicle area (118)).

A lift controller (120) may be a computing device (e.g., a separate device connected to other components of the lift system (114) or an integrated control system) that is operable to control various aspects of the lift. For example, the lift controller (120) may, based upon user inputs or automatically, provide electronic signals to cause a lift post (122, 130) to raise or lower lift arms or to cause one or more lift arms (124, 132) extending from a lift post to rotate, extend, retract, raise, or lower adapters and cause other mechanical movement by the lift arms (124, 132). The lift controller (120) may also receive information from one or more lift cameras (126, 134) and lift sensors (128, 136) captured from the vehicle area (118), which may be used by one or more of the lift controller (120), the site server (108), or the identification server (100) to influence the behavior and performance of the lift automation system (10), as will be discussed in more detail below. The lift cameras (126, 134) and lift sensors (128, 136) may be collectively referred to herein as lift area detectors, as they allow the lift controller (120) to detect and receive information on physical characteristics of the vehicle area (118).

The lift cameras (126, 134) may be positioned in various locations, including on the lift post (122, 130) and directed at the vehicle area (118) to capture image data from a vehicle (e.g., vehicle and wheel size, shape, position) or vehicle area (e.g., the presence of a technician or other person within the vehicle area), on the lift arms (124, 132) and directed at the vehicle area (118) to capture image data from a vehicle (e.g., profile views of lift point locations), within an adapter of the lift arms (124, 132) to capture images data from a vehicle (e.g., plan views of lift point locations), as well as other positions. The lift sensors (128, 136) may be positioned in various locations, including on the lift post (122, 130) and directed at the vehicle area (118) to capture data such as proximity of various portions of the vehicle relative to the mounting points of the lift sensors (128, 126). Placement and uses of lift cameras (126, 134) and lift sensors (128, 136) will be described in more detail below. As will be apparent to one of ordinary skill in the art in light of this disclosure, variations on the lift system (114) of FIG. 2 exist. For example, not all implementations will have multiple lift cameras (126, 134) or multiple lift sensors (128, 136), and some implementations may have other devices or sensors performing similar functions (e.g., a camera may be configured to act as a proximity sensor, a camera may be configured to detect four-corner vehicle proximity by placement of QR codes or other digital identifiers at corners of the vehicle, wireless triangulation may be used to detect positions of BLUETOOTH transceivers placed at corners of the vehicle or near lift points).

As yet another variation, it should be understood that the lift system (114) may have varying types of lifts and lift configurations, as has been described. For example, the lift system (114) may not be a two-post lift having posts such as the lift posts (122, 130), or may be a type of vehicle lift that does not have lift arms such as the lift arms (124, 132). Some implementations of the lift system (114) may instead or additionally include one or more of an in ground lift that lifts a vehicle by its wheels or by a set of repositionable (e.g., along a single axis parallel to the vehicle) lifting carriages, a set of rolling jacks, a scissor or accordion lift, sets of mobile lift columns (e.g., two or more mobile posts that may be rolled into place at lifting points or wheels of a vehicle). In some implementations, one or more of the features of the vehicle lift system (114) may also be applied in other areas where vehicles are stored, lifted, or carried. For example, a towable car carrier that is designed to carry one or more vehicles may have manually or automatically adjustable ramps and vehicle pads that may be operated when loading vehicles for transport. Devices such as the lift sensors (128, 136), lift cameras (126, 134), and lift controller (120) may be combined with such a vehicle carrier and configured to provide one or more of the features or functions described herein, such as aiding in the safe placement of vehicles. In this manner, the sensors (128, 136) and lift cameras (126, 134) may be widely distributed across a plurality of vehicle lifts or related system, and leveraged to gather images and other sensor data through numerous real world uses as a distributed sensor network, which data itself can be used to grow and refine automated processes for identifying vehicles and portions of vehicles.

Figure 3:
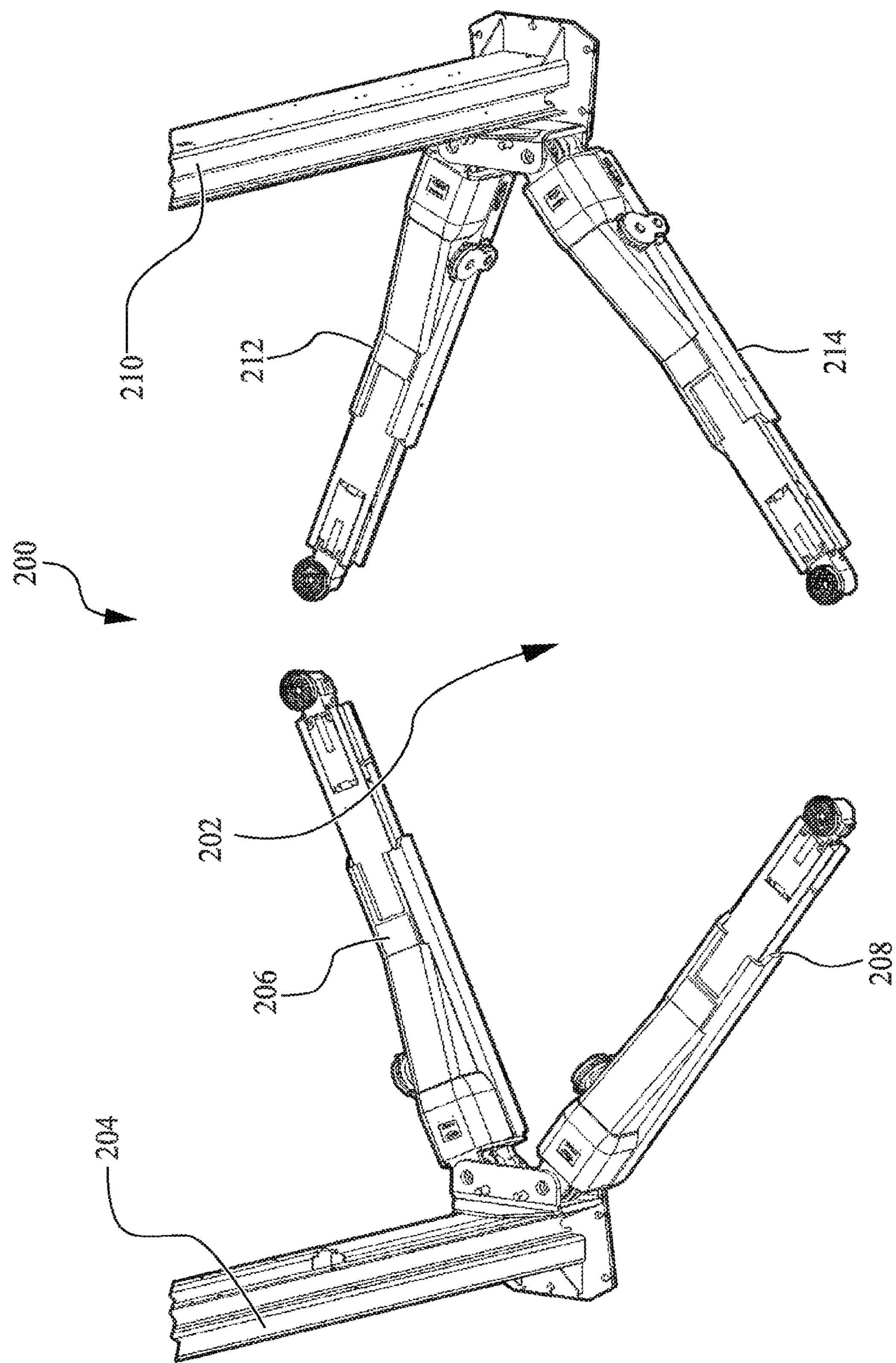
FIG. 3 is a front perspective view of an exemplary vehicle lift usable with the lift automation system.
Figure 4:
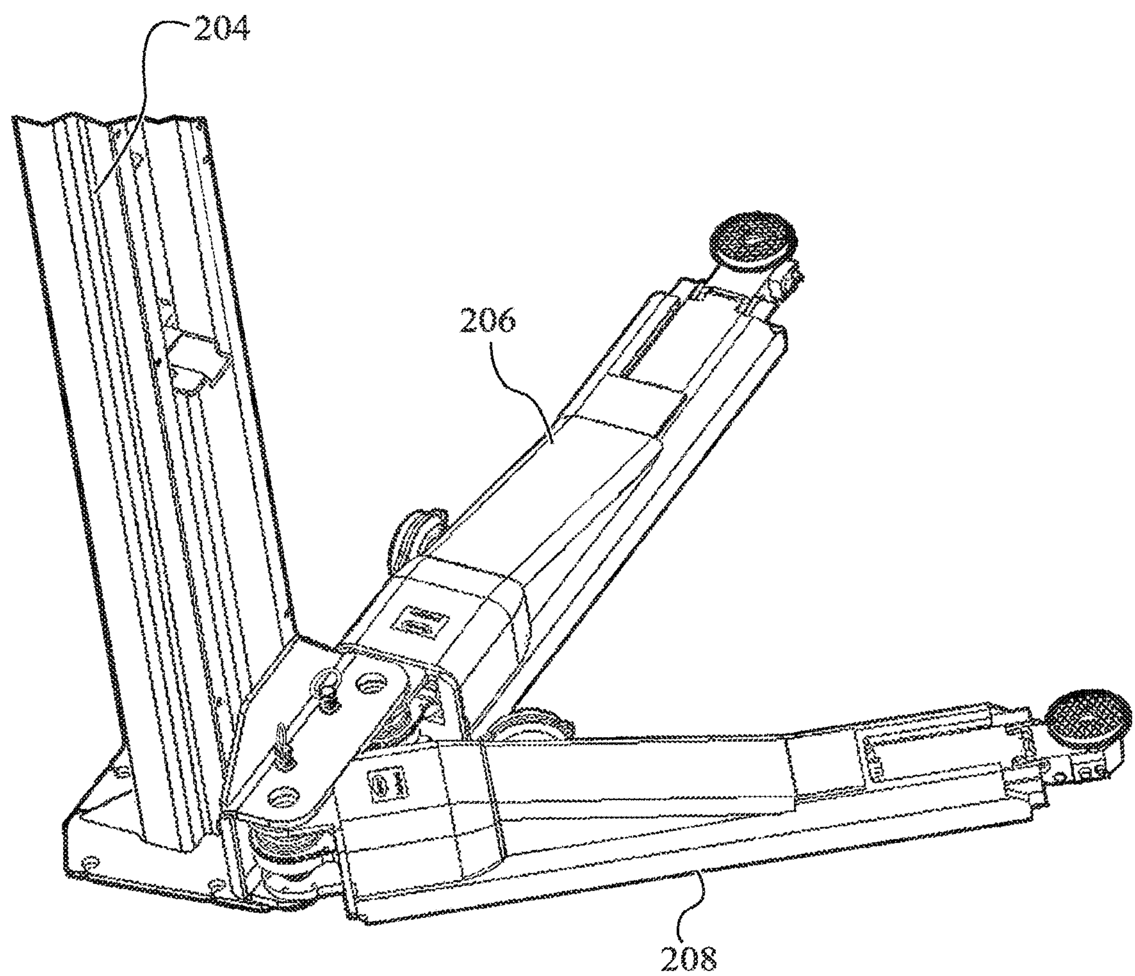
FIG. 4 is a front perspective view of an exemplary lift post of the vehicle lift.

As has been discussed, lift systems may also have differing designs and layouts other than the shown two-post lift system (114). For example, other lift systems may have four posts, may be drive-on style lifts, or may have other configurations. To provide more information on one exemplary lift system that may be used with the lift automation system (10), FIGS. 3 and 4 show front perspective views of an exemplary vehicle lift (200) and an exemplary lift post (204). The vehicle lift (200) comprises a lift post (204) and a lift post (210) positioned on opposite sides of a vehicle area (202). The lift post (204) comprises a lift arm (206) and a lift arm (208), and the lift post (210) comprises a lift arm (212) and a lift arm (214). The lift arms (206, 208, 212, 214) may support varying types of movements, including rotating relative to the lift posts (204, 210) and ascending and descending the lift posts (204, 210), as well as various adjustments (e.g., extending, retracting, raising, lowering) to the lift point adapter, as will be described in more detail below. The vehicle lift (200) may be operated to position each of the lift arms (206, 208, 212, 214) underneath lift points of a vehicle in the vehicle area (202) such that they make contact and engage with the frame of the vehicle, allowing it to be raised to a desired height as the lift arms (206, 208, 212, 214) ascend the lift posts (204, 210).

For the sake of clarity, the respective lift posts (204, 210) and the respective lift arms (206, 208, 212, 214) are each substantially similar to the other(s) in design and function, though some details may be varied (e.g., the lift post (204) may have mirrored portions to reflect that they are located on either side of the vehicle area (202), while the lift arm (206) may be of a different length and may support different retraction and extension lengths than the lift arm (208)) in particular implementations. As such, the lift posts (204, 210) and the lift arms (206, 208, 212, 214) will be discussed interchangeably with a focus on the lift post (204) and the lift arm (206) unless otherwise noted.

II. Exemplary Lift Arm

Figure 5:
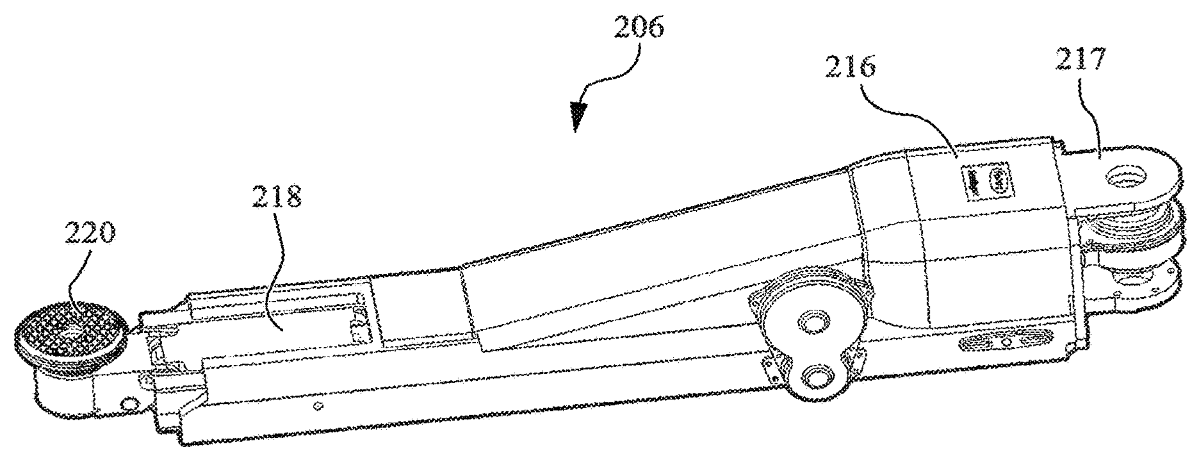
FIG. 5 is a front perspective view of an exemplary lift arm of the vehicle lift.
Figure 6:
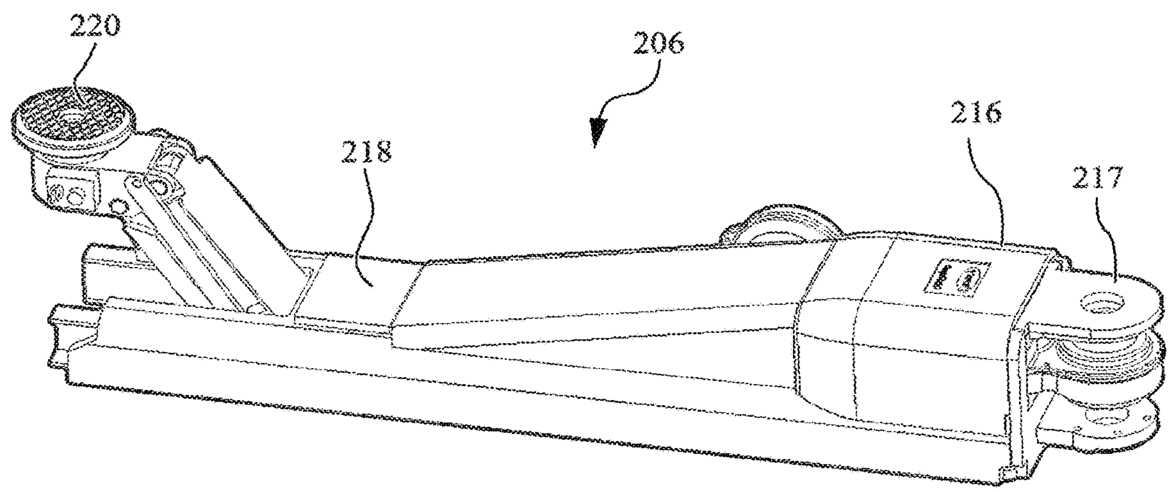
FIG. 6 is a front perspective view of the lift arm with an exemplary adapter assembly in a raised position.

FIG. 5 is a front perspective view of an exemplary lift arm such as the lift arm (206). As can be seen, the lift arm (206) comprises an outer arm (216) having a post connection (217) at its proximal end that a pin (219), such as that shown in FIG. 7, or other fastener may be inserted into to connect the lift arm (206) to the lift post (204) and allow for rotational movement relative to the lift post (204). The lift arm (206) also comprises an inner arm (218) positioned within the outer arm (216) and connected to the outer arm (216) such that it can be extended and retracted from the distal end of the outer arm (216). The inner arm (218) comprises an adapter assembly (220) at its distal end that, with reference to FIG. 6, can be raised and lowered relative to the inner arm (218). Raising and lowering the adapter assembly (220) relative to the inner arm (218) (e.g., as opposed to raising and lowering the entire lift arm (206) along the lift post (204)) may be advantageous in allowing the adapter assembly (220) to contact or nearly contact a vehicle frame lift point prior to operating the lift post (204), and may also advantageously allow the vehicle lift (200) to position adapter assemblies (220) at different heights relative to each other so that a vehicle having lift points at differing heights may be raised by the vehicle lift (200) while remaining substantially parallel to the ground surface.

Figure 7:
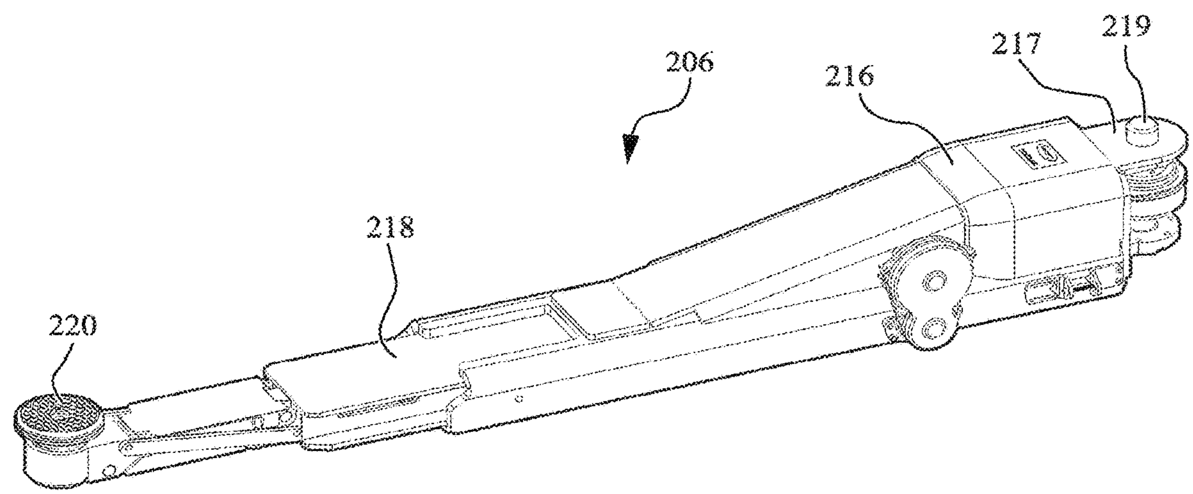
FIG. 7 is a front perspective view of the lift arm with an exemplary inner arm extended.

As has been described, the inner arm (218) may also be extended and retracted from the outer arm (216) as can be seen in FIG. 7, which shows a front perspective view of the lift arm (206) with an exemplary inner arm such as the inner arm (218) extended. While the adapter assembly (220) is shown at a lowered position in FIG. 7, it should be understood that the lift arm (206) may be operated independently of each other such that the inner arm (218) may be extended independently of the position of the adapter assembly (220), and the adapter assembly (220) may be raised and lowered independently of the extension of the inner arm (218).

Figure 8A:
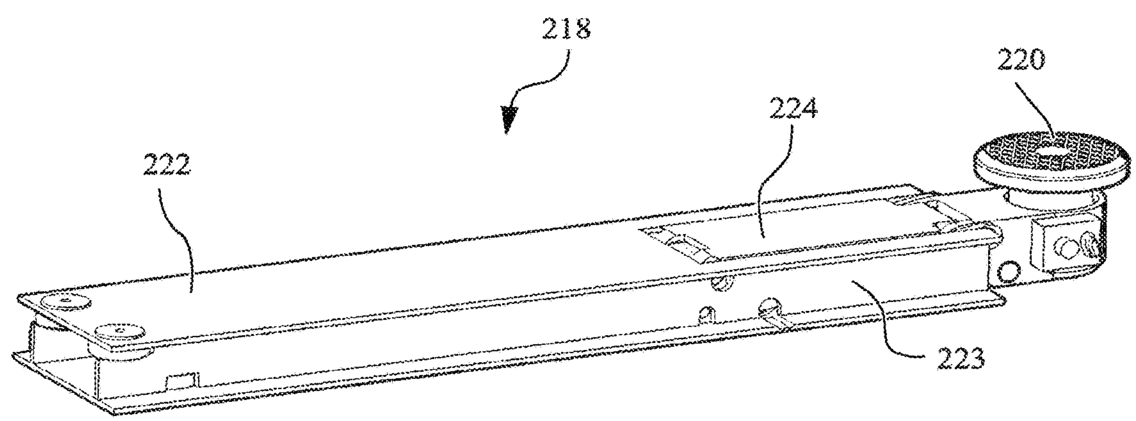
FIG. 8A is a front perspective view of an alternate exemplary inner arm.
Figure 8B:
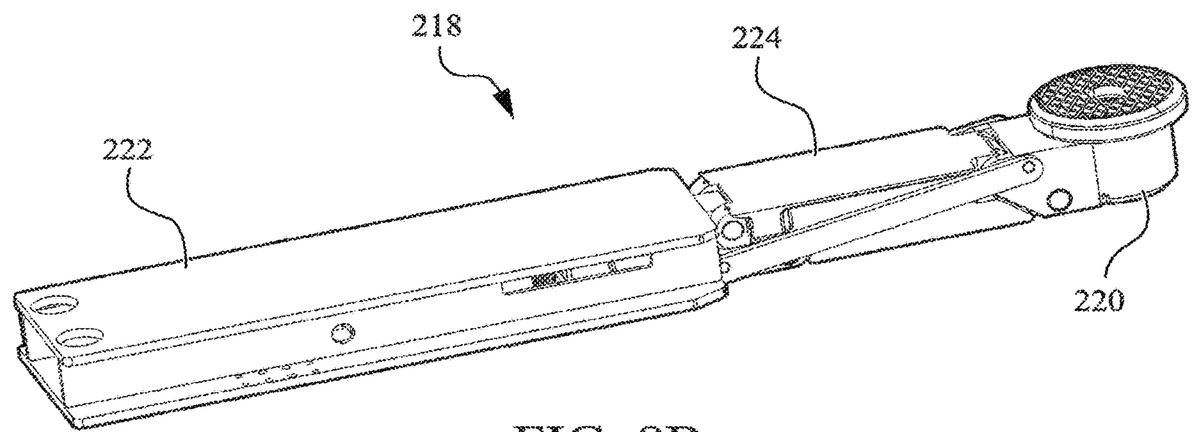
FIG. 8B is a front perspective view of the inner arm.

FIGS. 8A and 8B show two variations on the inner arm (218). The inner arm (218) shown in 8A is comprised of the adapter assembly (220) positioned at the distal end of the inner arm vertical extension, which itself is positioned at the distal end of an inner arm horizontal extension (222). The inner arm horizontal extension (222) fits within the outer arm (216) and houses internal components that are operable to raise and lower the adapter assembly (220), and also connects to drive components of the outer arm (216) that are operable to extend and retract the inner arm (218), as will be discussed in more detail below. The inner arm (218) also comprises a set of side rails (223) that extend past the inner arm horizontal extension (222) on each side of the inner arm vertical extension (224). While not required, the set of side rails (223) may cover and protect components of the inner arm vertical extension (224) during use and storage. The inner arm (218) of FIG. 8B has similar components and features as the inner arm (218) of FIG. 8A but does not have side rails. This may be advantageous in reducing the overall static length and weight of the inner arm (218) and may also allow for easier access to and service of the components of the inner arm vertical extension (224) when the adapter assembly (220) is in a lowered position.

Figure 9:
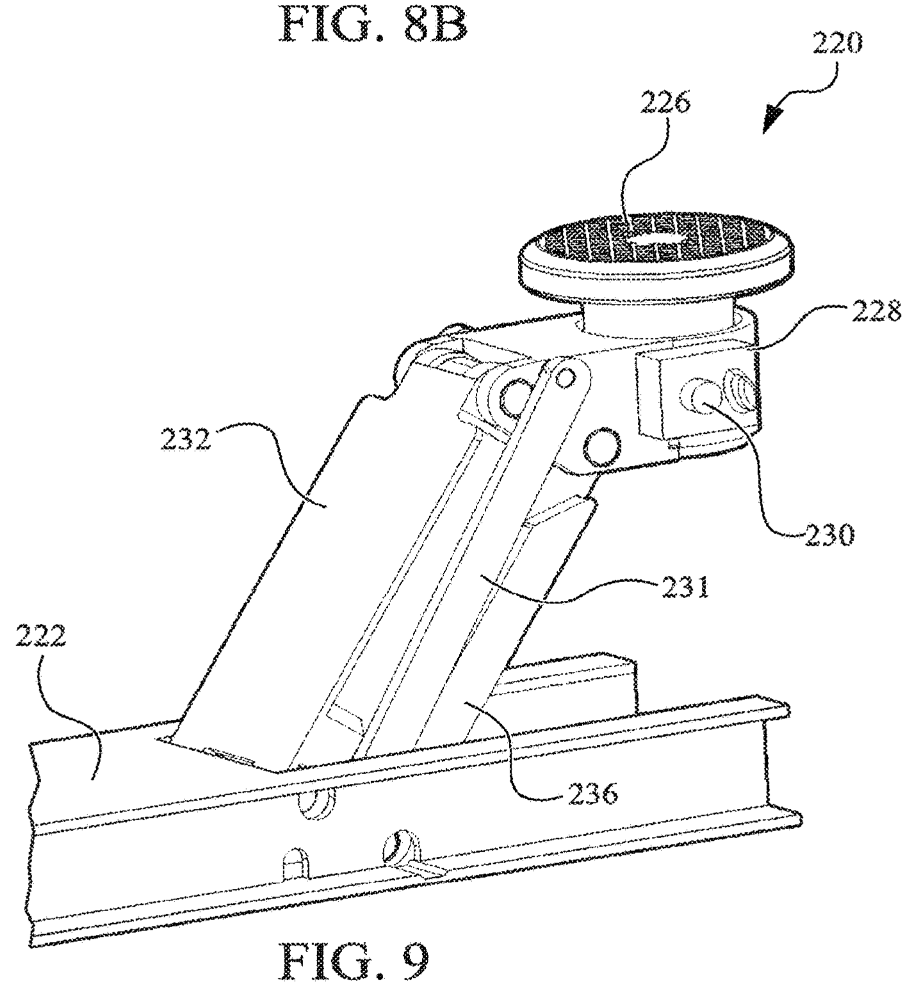
FIG. 9 is a front perspective view of an exemplary inner arm vertical extension of the alternate inner arm with the adapter assembly in a raised position.

Turning now to FIG. 9, that figure shows a front perspective view of an exemplary inner arm vertical extension such as the inner arm vertical extension (224). The adapter assembly (220) comprises an adapter (226) and an adapter holder (228). The adapter (226) may provide a semi-rigid textured surface or other suitable surface for making contact with a vehicle lift point, and as such the adapter (226) may vary in size and shape depending upon a particular application. For example, while the adapter (226) is shown as a substantially flat circular surface, adapters may also be square, may come in varying sizes, and may also provide more substantial surface variations for particular applications (e.g., some adapters provide a wedge-like slot for vehicle frame rails to rest within, while others may provide a circular cup or other shape specific to vehicle lift points from particular vehicle manufacturers). As such, the adapter (226) may be threaded onto, snapped into, or otherwise connected into the adapter holder (228) to allow for ease in supporting adapters of varying characteristics.

The adapter assembly (220) also comprises a profile camera (230) positioned on a front or side edge of the adapter holder (228) such that it can capture image data from the vehicle area (202) when desirable. Such image data may be displayed on a device such as the lift monitor device (110) and used by a user to help manually position the lift arm (206) relative to a vehicle lift point, and to provide automated lift arm (206) placement in some implementations. In implementations where a user may manually control the lift arm (206) using the lift monitor device (110) or another device, such image data may allow a user to view lift arm movements in real time and maneuver the lift arm (206) into a desired location by providing a side profile view of the underside of the vehicle, where lift points are generally located. In such an implementation, a user could position each lift arm (206, 208, 212, 214) from a single location without needing to directly view the underside of the vehicle. The camera (230) may also include features such as a spotlight or other light source to aid in image capture and may provide (e.g., via a wired connection contained within the lift arm (206) or via a wireless transmission such as Bluetooth or Wi-Fi) captured image data to the lift controller (120) or another device (e.g., the site server (108)), which may then transmit it to one or more lift monitor devices (110) for viewing. As will be apparent to one of ordinary skill in the art in light of this disclosure, the camera (230) may also communicate directly with the lift monitor device (110) (e.g., via a wireless connection such as Bluetooth or Wi-Fi) if desirable.

The adapter assembly (220) may also comprise one or more sensors such as the lift sensors (128), which may include accelerometers, weight or pressure sensors, inclinometers, temperature sensors, proximity sensors, and other sensors which may provide information indicating the status of the adapter assembly (220) or other components of the inner arm (118) during use, which provides feedback control to the positioning system and otherwise may be beneficial in improving the usability and safety of the lift arm (206).

With continued reference to FIG. 9, it can be seen that the inner arm vertical extension (224) comprises an upper linkage (232) and a lower linkage (236) connected together by a cross linkage (231), which allow the inner arm vertical extension (224) to be raised and lowered by an actuator contained within the inner arm horizontal extension (222).

Figure 10A:
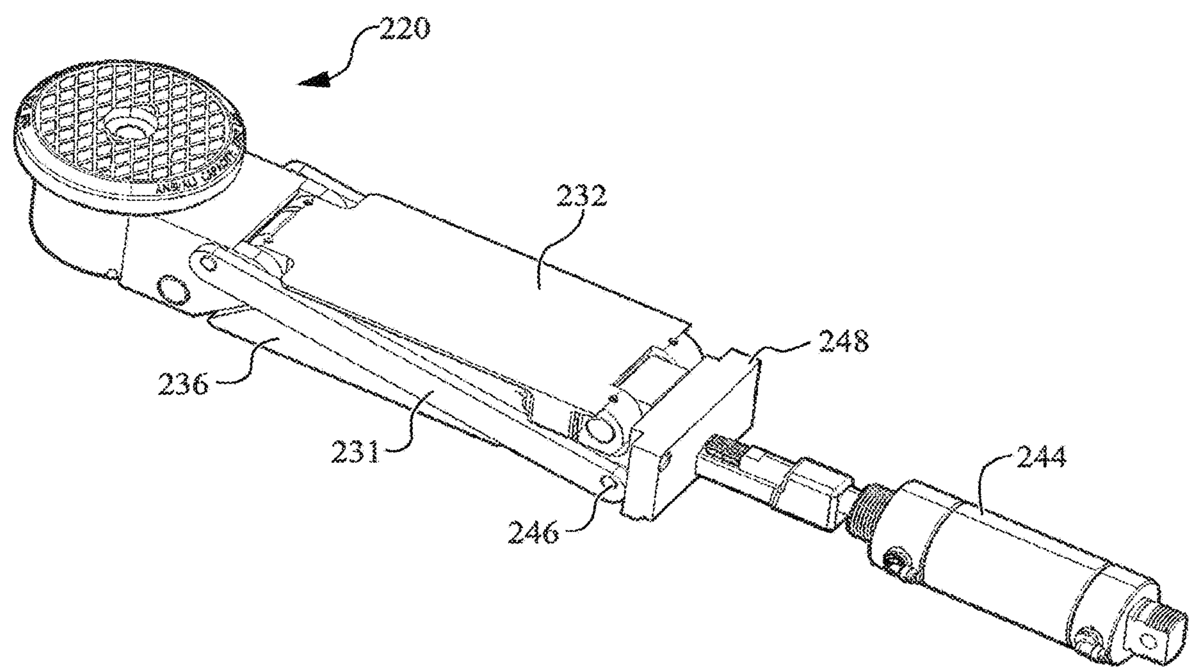
FIG. 10A is a front perspective view of the inner arm with a case removed to show an actuator.

As can be seen in FIG. 10A, which shows a front perspective view of the inner arm (218) with the inner arm horizontal extension (222) and other components removed, an actuator (244) is operable to linearly extend and retract a cross linkage joint (246). The cross linkage joint (246) is a rotatable sliding joint where the cross linkage (231) connects to a linkage block (248). The upper linkage (232) and the lower linkage (236) are each rotatably connected to the linkage block (248) and the adapter assembly (220). In this manner, as the actuator (244) is operated to extend, the cross linkage joint (246) slides horizontally along the linkage block (248), which causes the adapter assembly (220) to move to a raised position while remaining substantially parallel to the inner arm (218).

When the adapter assembly (220) is raised or lowered, it's current elevation may be determined based upon varying factors. For example, in some implementations, the adapter assembly (220) elevation may be determined based upon the distance which the actuator (244) has extended or retracted. As another example, the inner arm vertical extension (224) may also include an inclinometer configured to provide data indicating a zero degree incline when at its lowest point (e.g., parallel to the ground), and calibrated to convert the angle provided by the inclinometer to varying elevations (e.g., a 15 degree incline may be calibrated as a 6 inch extension, a 30 degree incline a 12 inch extension, a 45 degree incline as an 18 inch extension). Such feedback may be usable by the lift controller (120) to raise and lower the adapter automatically to a desired height, or to ensure that the actuator operates within a desired range of motion.

Figure 10B:
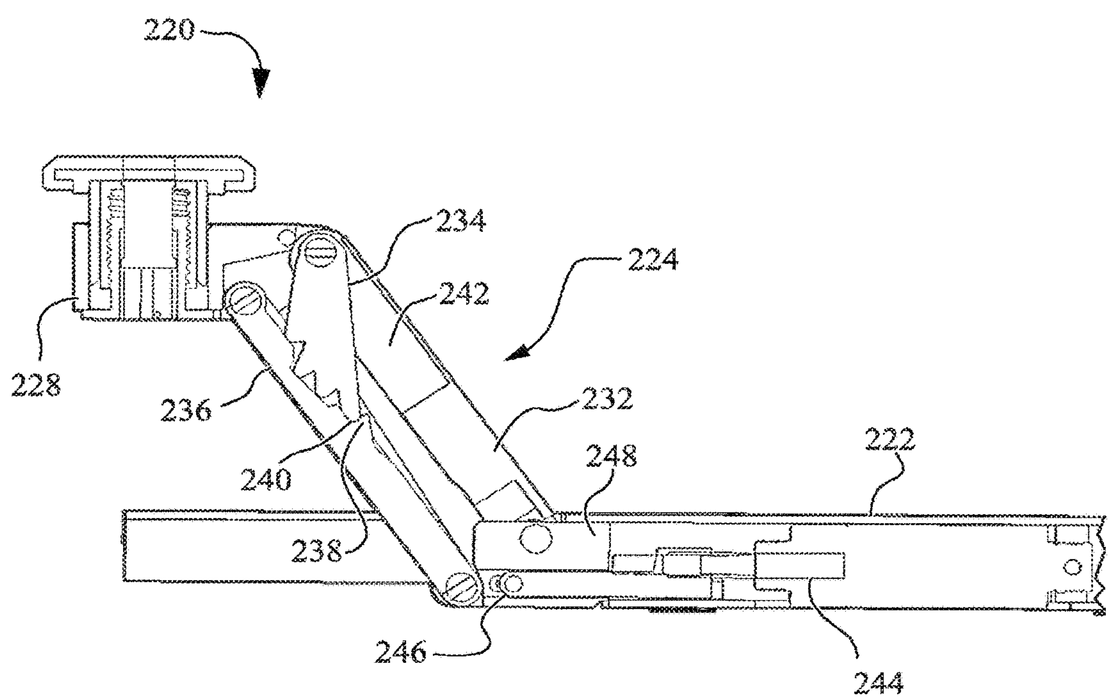
FIG. 10B is a side cross-sectional view of the inner arm with the adapter assembly in a raised position.

FIGS. 10B and 11A-11E provide additional context for the function of raising and lowering the adapter assembly (220) as described. FIG. 10B shows a side cross sectional view of the inner arm with the adapter assembly in a raised position. The actuator (244) can be seen within the inner arm horizontal extension (222) and can be seen connected to the cross linkage joint (246). A pawl (234) or latch dog can also be seen in the cross sectional view. The pawl (234) is rotatably connected at the distal end of the upper linkage (232) and, when the adapter assembly (220) is in a lowered position, fits within a pawl rest (242) of the upper linkage (232). As the adapter assembly (220) is raised by operation of the actuator (244), the pawl (234) rotates downwards under the force of gravity, and at varying stages of ascension by the adapter assembly (220), a pawl tooth (240) will catch and rest within a pawl catch (238) of the lower linkage (236).

When the pawl tooth (240) is at rest on the pawl catch (238), the weight of the inner arm horizontal extension (224) may rest upon the pawl catch (238), such that continued operation of the actuator (244) is unnecessary, and such that a failure of the actuator (244) will not result in a raised adapter assembly (220) falling under the force of gravity back to a lowered position. In this manner, the pawl (234) may engage with the pawl catch (238) in order to mechanically support the great forces placed upon it from a vehicle supported by the adapter assembly (220), rather than allowing such forces to be translated to the actuator (244). Additionally, the pawl (234) may also function as a safety mechanism, such that if linear actuator (244) were to fail during operation, the adapter assembly would only fall a short distance until the most recently engaged pawl tooth, such as the pawl tooth (240), strikes the pawl catch (238). The pawl (234) may be lifted or disengaged form the pawl catch (238) by operation of a release mechanism when the adapter assembly (220) is lowered, as will be discussed in more detail below.

Figure 11A:
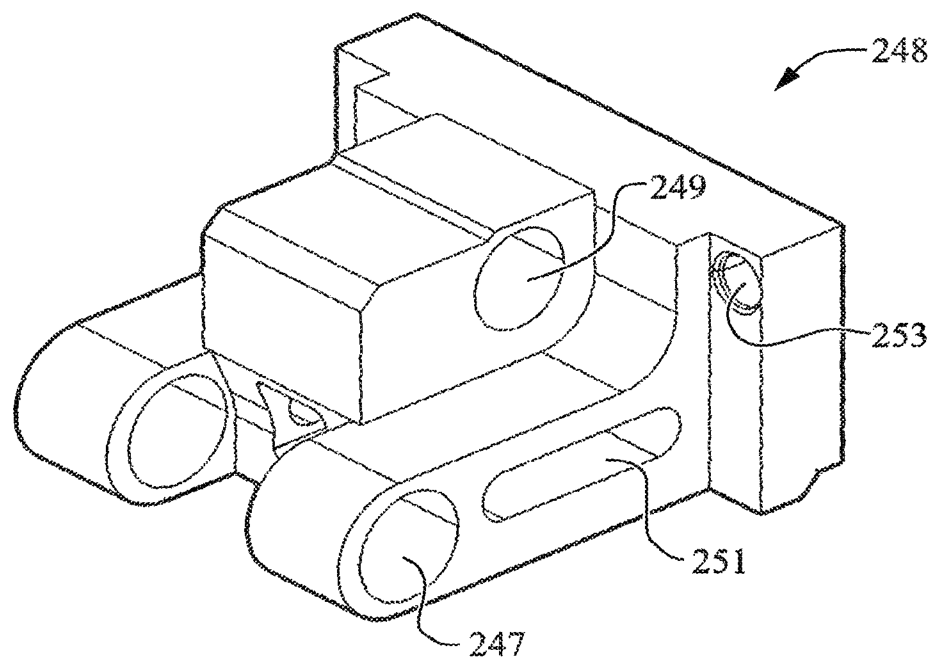
FIG. 11A is a front perspective view of an exemplary linkage block of the inner arm.

FIG. 11A-11E each show more detailed views of components of the inner arm vertical extension (224). FIG. 11A shows a front perspective view of an exemplary linkage block, such as the linkage block (248), of the inner arm (218). The linkage block (248) comprises an upper linkage joint (249), which is rotatably connected to the upper linkage (232), a lower linkage joint (247), which is rotatably connected to the lower linkage (236), and a cross linkage slide (251) which contains the cross linkage joint (246), and which allows the cross linkage joint (246) to both rotate and slide horizontally during operation of the actuator (244). A pawl release slot (253) allows a cable, rod, or other linkage to pass from the inner arm horizontal extension (222) through the linkage block (248) to allow for release of the pawl (234) from the pawl catch (238) by operation of an actuator or other motor (not pictured) contained within the inner arm horizontal extension (222).

Figure 11B:
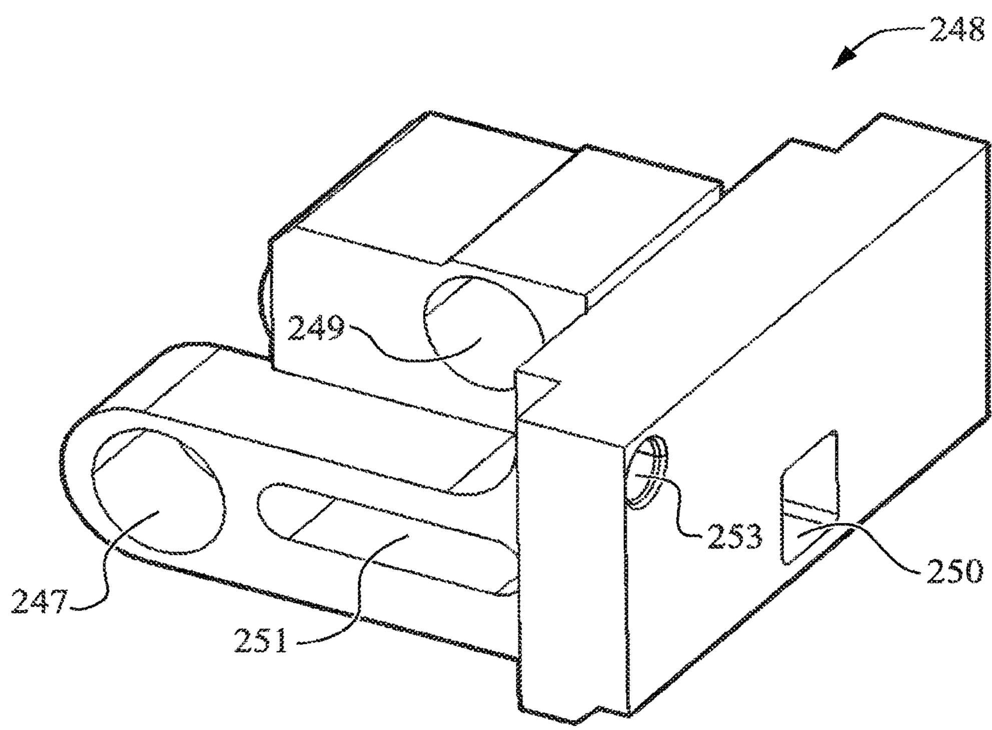
FIG. 11B is a rear perspective view of the linkage block.
Figure 11C:
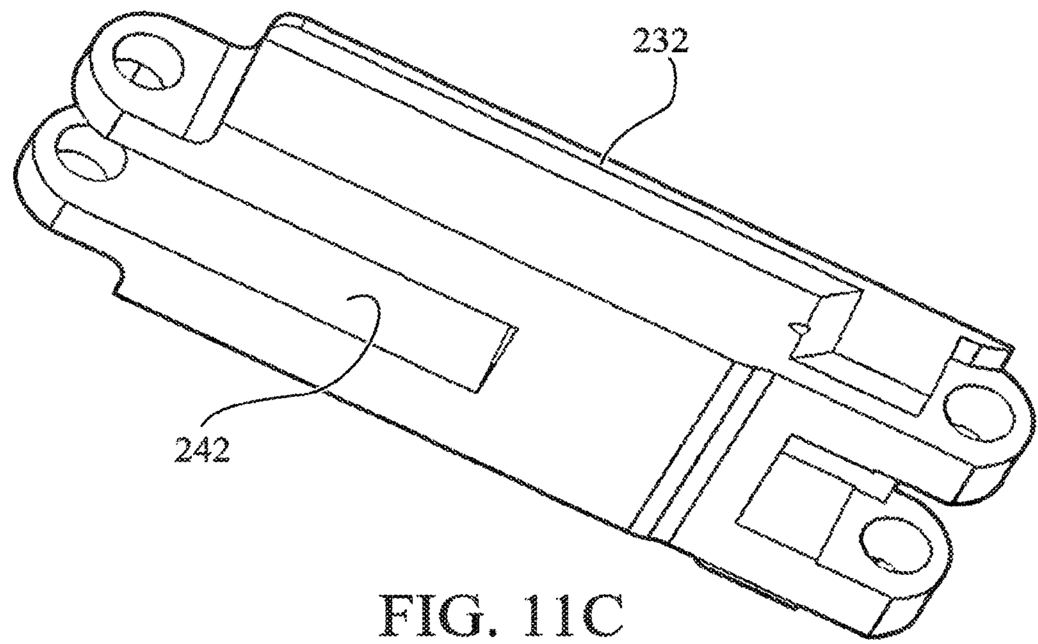
FIG. 11C is a bottom perspective view of an exemplary upper linkage of the inner arm.
Figure 11D:
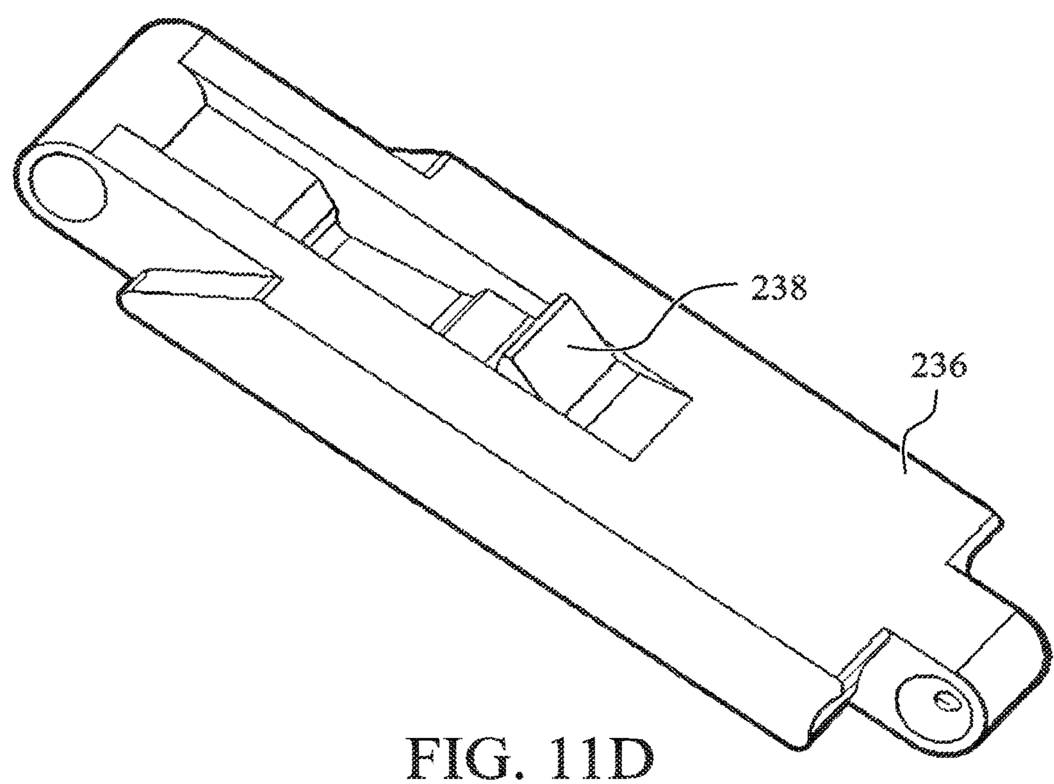
FIG. 11D is a top perspective view of an exemplary lower linkage of the inner arm.
Figure 11E:
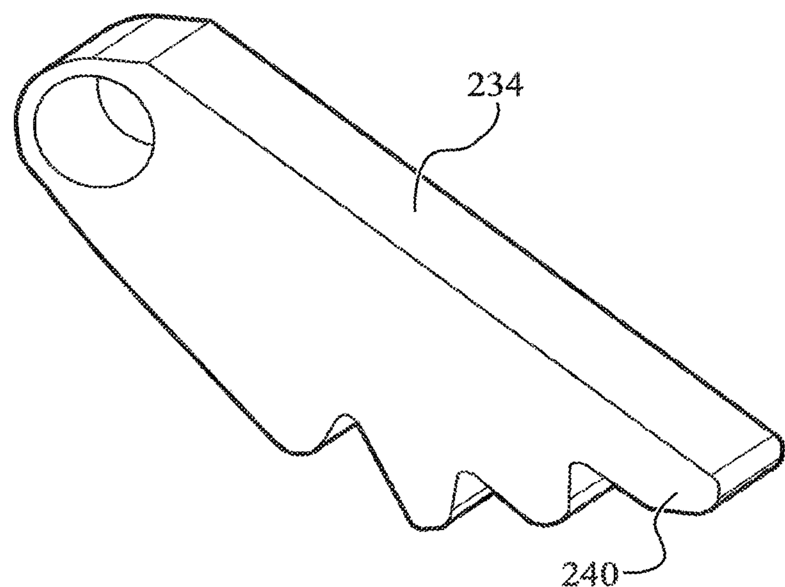
FIG. 11E is a front perspective view of an exemplary pawl of the inner arm.

With reference to FIG. 11B, which shows a rear perspective view of the linkage block (248), an actuator receiver (250) can be seen which allows the distal end of the actuator (244) to extend and retract through the linkage block (248) to thereby cause the cross linkage joint (246) to slide along the cross linkage slide (251). As for the remaining portions of FIG. 11, FIG. 11C shows a bottom perspective view the upper linkage (232), in which the pawl rest (242) and the distal and proximal rotatable joint connections are visible, while FIG. 11D shows a top perspective view of the lower linkage (236), in which the pawl hold (238) and the distal and proximal rotatable joint connections are visible, and FIG. 11E shows a front perspective view of the pawl (234), in which set of pawl teeth including the pawl tooth (240) and a rotatable joint connection are visible.

Figure 12:
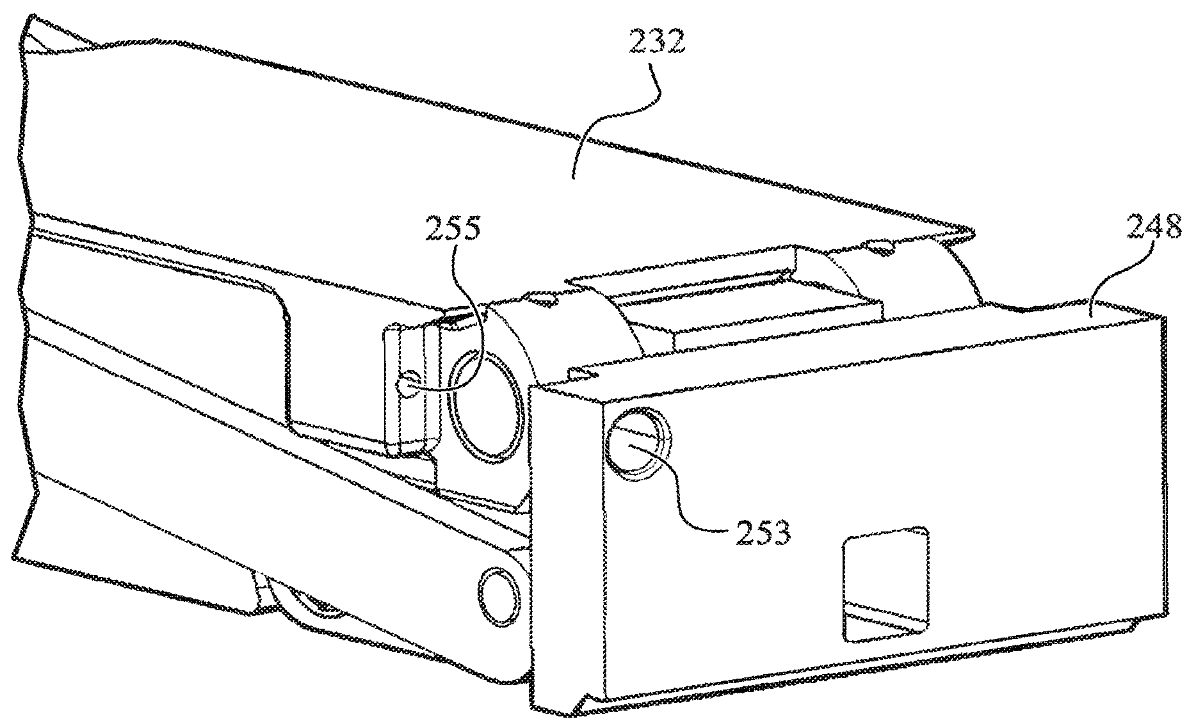
FIG. 12 is a rear perspective view of the linkage block showing an exemplary release mechanism for the pawl.

As has been described, the pawl (234) may be released by function of an actuator or motor when the adapter assembly (220) is lowered. FIG. 12 shows a rear perspective view of the linkage block (248), showing an exemplary release mechanism for the pawl comprising the pawl release slot (253) on the linkage block (248) as well as a pawl release slot (255) on the upper linkage (232). A cable, rod, or other linkage may pass from an actuator or lock release cylinder located in the inner arm horizontal extension (222), where the actuator (244) is contained, through the pawl release slot (253) and the pawl release slot (255) to be physically connected to the pawl (234) or a rotatable joint to which the pawl (234) is attached, such that retraction of the cable or other linkage causes the pawl (234) to rotate upwards and into the pawl rest (242). Such a retraction may be performed by the lift arm (206) in combination with operation of the actuator (244) to slightly raise the adapter assembly (220), such that the pawl tooth (240) disengages from the pawl catch (238) immediately prior to retraction.

Figure 13:
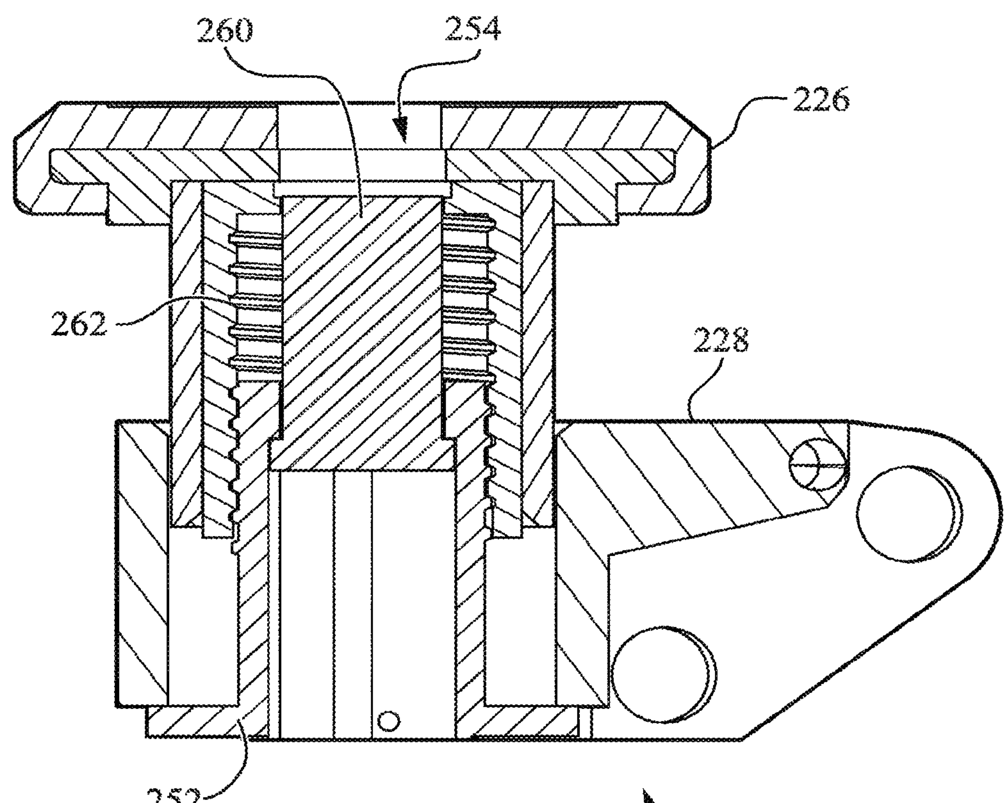
FIG. 13 is a side cross-sectional view of the exemplary adapter assembly.

Turning now to FIG. 13, that figure shows a side cross sectional view of an exemplary adapter assembly such as the adapter assembly (220). As can be seen in the cross section view, the adapter (226) comprises an adapter threading (262) that allows the adapter to be attached to an adapter holder threading (252), to allow for various types of adapters to be easily installed on the adapter assembly (220). The adapter (226) further comprises an adapter aperture (254) in the top surface of the adapter (226). The adapter aperture (254) is positioned above a corresponding void of the adapter holder threaded (252), such that there is a cylindrical void running from the bottom of the adapter assembly (220) to the surface of the adapter (226) and through the adapter aperture (254). With continued reference to FIG. 13, it can be seen that an adapter camera (260) having a cylindrical shape can be installed within the adapter assembly (220). The adapter camera (260) has similar features and capabilities, and may be used for similar purposes as the profile camera (230). The adapter camera (260) may provide image data from immediately beneath a lift point or other position, leading up to and during engagement of the adapter (226) with the lift point, which may help a user to manually position the lift arm (206) by viewing image data in real time, and may also allow for automatic positioning of the lift arm (206), as will be described in more detail below.

Figure 14A:
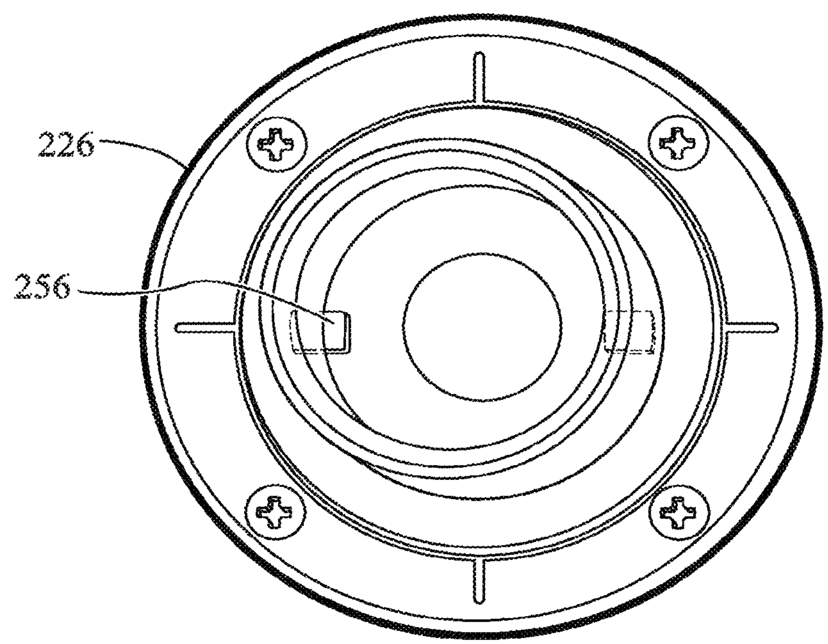
FIG. 14A is a bottom perspective view of an exemplary adapter removed from the adapter assembly.
Figure 14B:
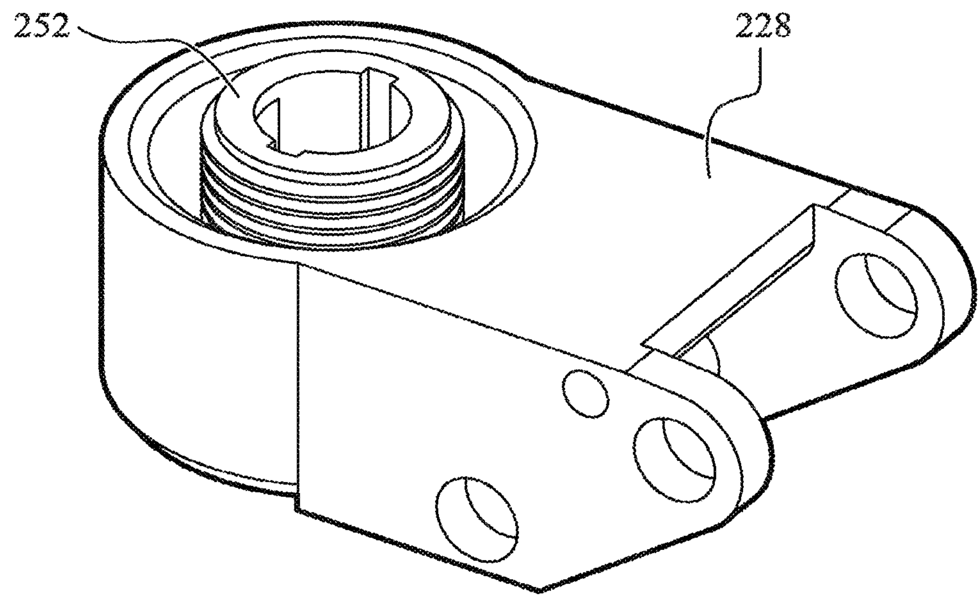
FIG. 14B is a front perspective view of an exemplary adapter housing of the adapter assembly.
Figure 14C:
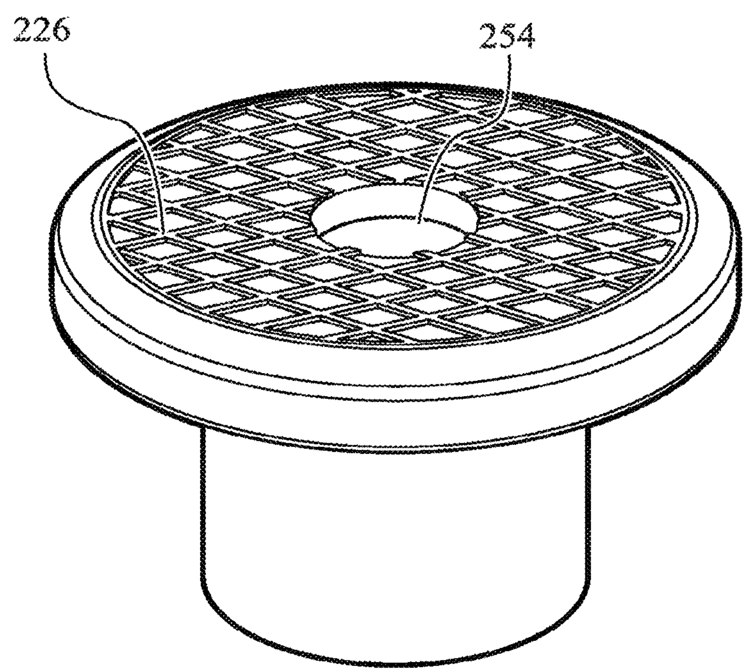
FIG. 14C is a top perspective view of the adapter.
Figure 14D:
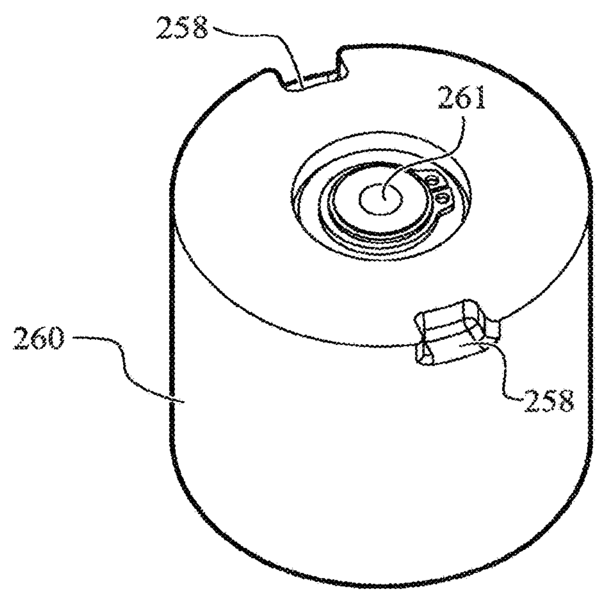
FIG. 14D is a top perspective view of an exemplary adapter camera of the adapter assembly.

FIGS. 14A-14D show additional views of the adapter assembly (220) as it relates to the adapter camera (260). For example, FIG. 14A shows a bottom perspective view of an exemplary adapter such as the adapter (226) removed from the adapter assembly (220), while FIGS. 14B and 14C separately show the adapter holder (228) and the adapter (226). The adapter (226) comprises a set of adapter tab slots (256) on the underside surface. The adapter tab slots (256) correspond with a set of camera positioning tabs (258) on the top edge of the camera (260), as can be seen in FIG. 14D, such that when camera (260) is installed within the adapter assembly (220) the adapter tab slots (256) guide the camera positioning tabs (258) into a position that orients the camera (260) in a predictable manner. Being able to predictably determine the rotational orientation of the camera (260) relative to the adapter assembly (220) may aid in later image capture and analysis, as a fixed or known perspective may simplify automated analysis of captured images.

Returning to FIG. 13, it can be seen that the camera (260) may be installed within the adapter assembly (220) such that the camera (260) is in a fixed orientation within the adapter holder threading (252), but may slide upwards and downwards within the adapter holder threading (252) as the adapter (226) is screwed and unscrewed from the adapter holder threading (252). In this manner, the camera (260) may be installed within the adapter holder threading (252) and rotatably connected to the adapter (226) just below the adapter aperture (254). As the adapter (226) is screwed in, the adapter (226) and the camera (260) will lower relative to the adapter assembly (220), while a lens (261) of the camera remains statically oriented and positioned just below the adapter aperture (254). Similarly, unscrewing the adapter (226) will raise the camera with the adapter (226) while the lens (261) remains statically oriented. Such functionality may be useful where, for example, the adapter (226) is slightly adjusted by hand to raise it to better contact a lift point, since the adapter (226) can be rotated without needing to re-orient or manually raise or lower the camera (260). This provides a consistent view through the adapter aperture (254) regardless of adjustment. Additionally, since the camera (260) is easily removable from the adapter assembly (220) and adapter (226), multiple types of adapters can be supported and usable with a single style of camera, such as the camera (260).

Figure 15:
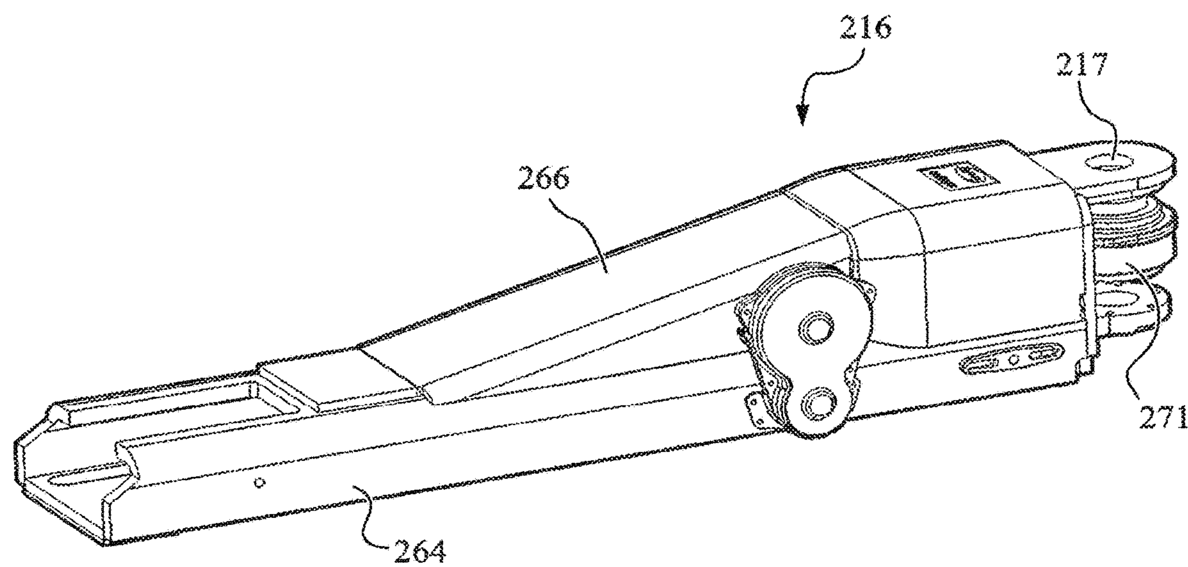
FIG. 15 is a front perspective view of an exemplary outer arm of the lift arm, with the inner arm removed.

Turning now to FIG. 15, that figure shows a front perspective view of an exemplary outer arm of the lift arm (206), such as the outer arm (216), with the inner arm (218) removed. In addition to housing the inner arm (218), the outer arm (216) contains additional components operable to rotate the outer arm (216) relative to the lift post (204), and to extend the inner arm (218). As seen in FIG. 15, the outer arm (216) comprises an inner arm sheath (264) and a motor cover (266). The inner arm sheath (264) holds the inner arm (218) such that the inner arm (218) can slide during extension and retraction and may also comprise a lock or limiter mechanism to prevent the inner arm (218) from extending past a certain point along the inner arm sheath (264).

Figure 16:
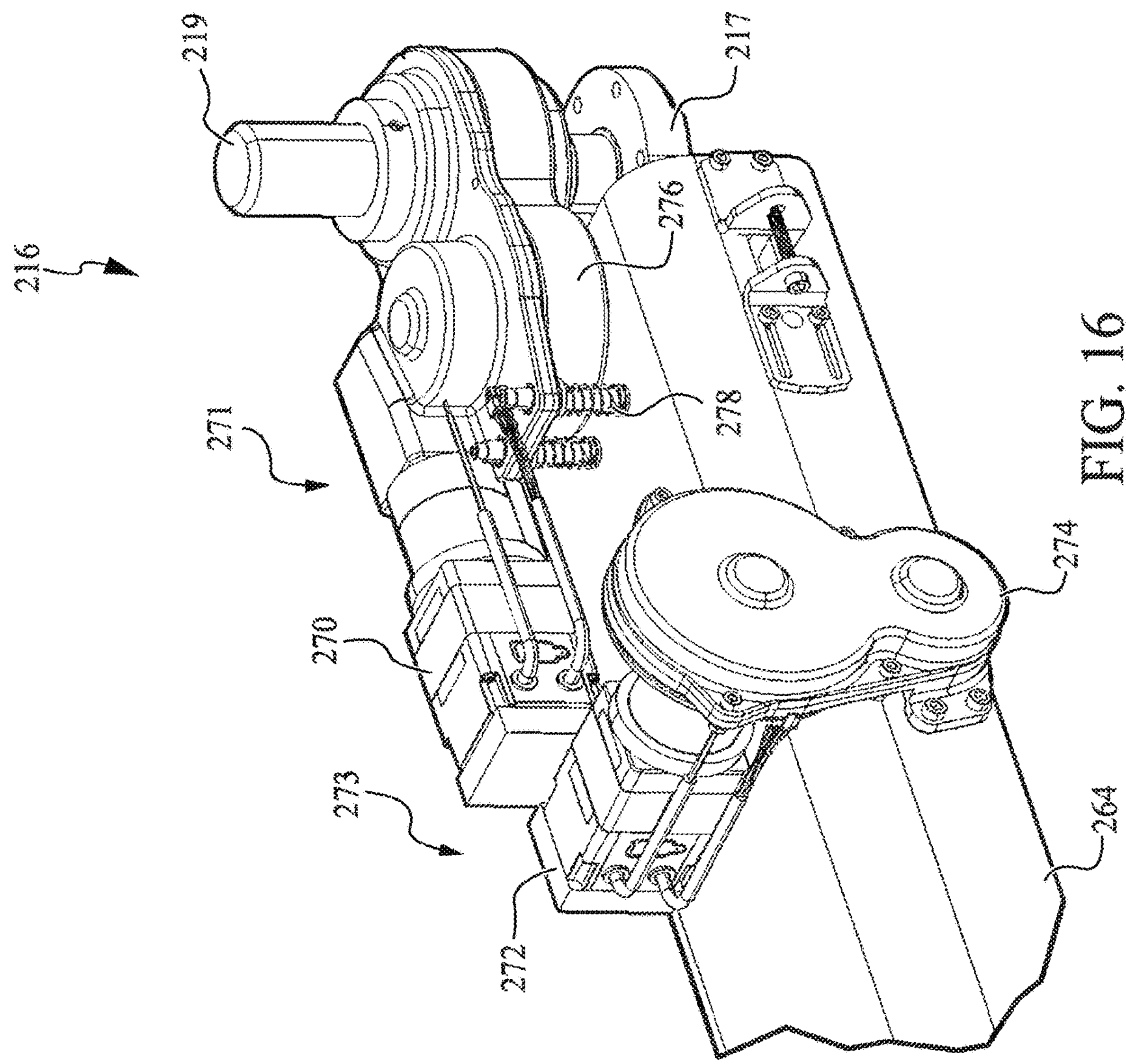
FIG. 16 is a front perspective view of the outer arm with an exemplary motor cover removed.

FIG. 16 shows a front perspective view of the outer arm (216) with an exemplary motor cover such as the motor cover (266) removed. As can be seen, the proximal end of the outer arm (216) comprises a rotation assembly (271) and an extension assembly (273). The rotation assembly (271) comprises a rotation motor (270) and a rotation gear box (276). The rotation assembly (271) is statically connected to the outer arm (216) with a floating connection (278) that allows some vertical movement of the rotation assembly (271) during operation. In this manner, the rotation gear box (276) may have an independent suspension relative to the outer arm (216), which allows the rotation assembly (271) to be mechanically connected for rotation of the outer arm (216) without being subjected to the same loads (e.g., lifted vehicles) as the outer arm (216), which could damage the rotation assembly (271). Instead, these loads are transferred to the post connection (217), while the rotational assembly (271) itself floats between the upper and lower members of the post connection (217), as can be seen in FIG. 15.

To further explain with reference to FIG. 16, the lower member of the post connection (217) is shown, while the upper member has been removed with the motor cover (266). The rotational assembly (271) is connected to a pin (219) inserted within the post connection (217) such that, when the rotation motor (270) is operated, the lift arm (206) rotates about the pin (219), which itself may be statically connected to the lift post (e.g., the pin (219) does not rotate relative to the lift post, while the post connection (217) rotates around the pin (219)). The post connection (217) may be seated within a receiver of the lift post that bears the weight of the lift arm (206) and any load it carries instead of the rotational assembly (271).

Figure 17A:
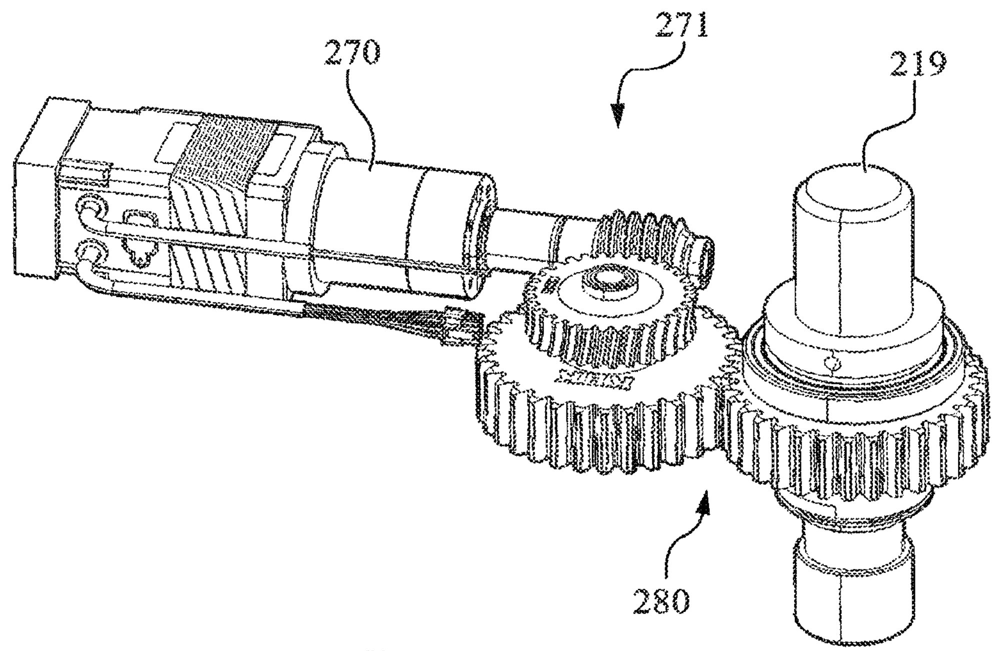
FIG. 17A is a front perspective view of an exemplary rotational motor assembly and gearbox of the outer arm.
Figure 17B:
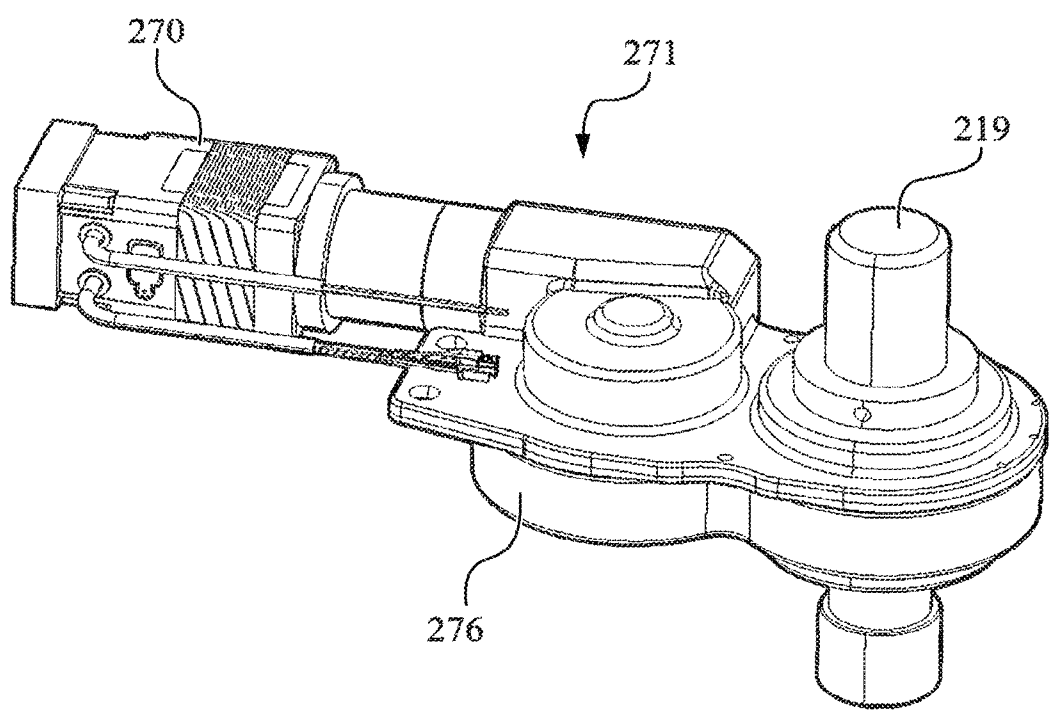
FIG. 17B is a front perspective view of the rotational motor assembly.

FIGS. 17A and 17B respectively show the rotation assembly (271) with the rotation gear box (276) removed and show the rotation assembly (271) isolated from the outer arm (216). With the rotation gear box (276) removed, it can be seen that the rotation motor (720) may be operated to cause a rotation gear set (280) to transfer power and rotate about the pin (219) (e.g., when the pin (219) is statically fixed within the post connection (217) and to a lift post).

Figure 18A:
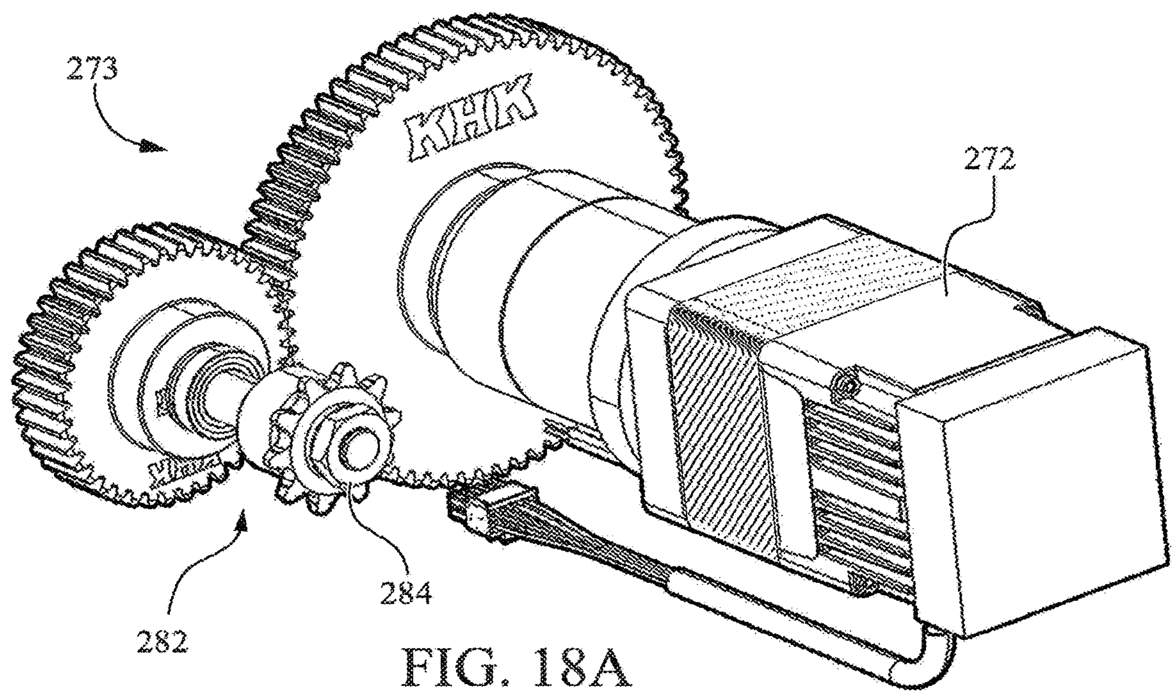
FIG. 18A is a front perspective view of an extension motor assembly and gearbox of the outer arm.
Figure 18B:
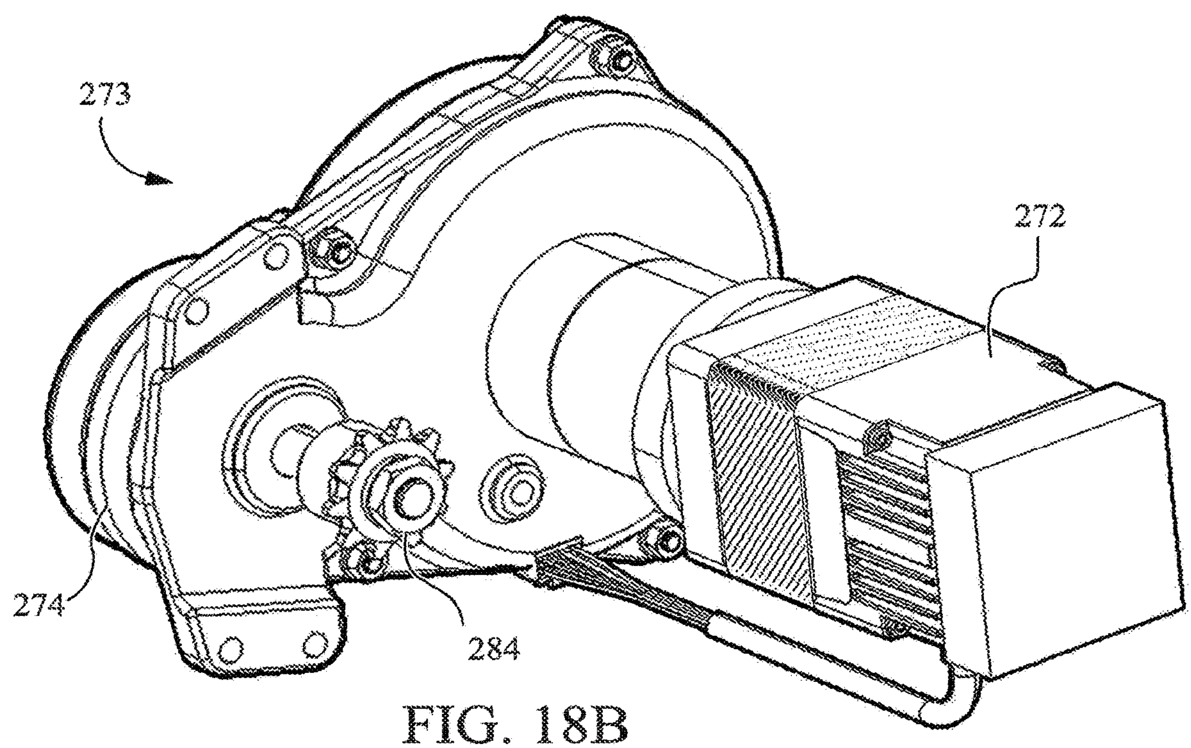
FIG. 18B is a front perspective view of the extension motor assembly.

Returning to FIG. 16, the extension assembly (273) comprises an extension motor (272) and an extension gearbox (274). The extension assembly (273) is statically mounted to the outer arm (216), and the extension motor (272) may be operated to transfer power through the extension gearbox (274) and into the inner arm sheath (264) in order to extend and retract the inner arm (218) contained therein. FIGS. 18A and 18B respectively show the extension assembly (273) with the extension gear box (274) removed and show the extension assembly (273) isolated from the outer arm (216). With the extension gear box (274) removed, it can be seen that the extension motor (272) may be operated to cause an extension gear set (282) to transfer power and rotate a drive gear (284).

Figure 18C:
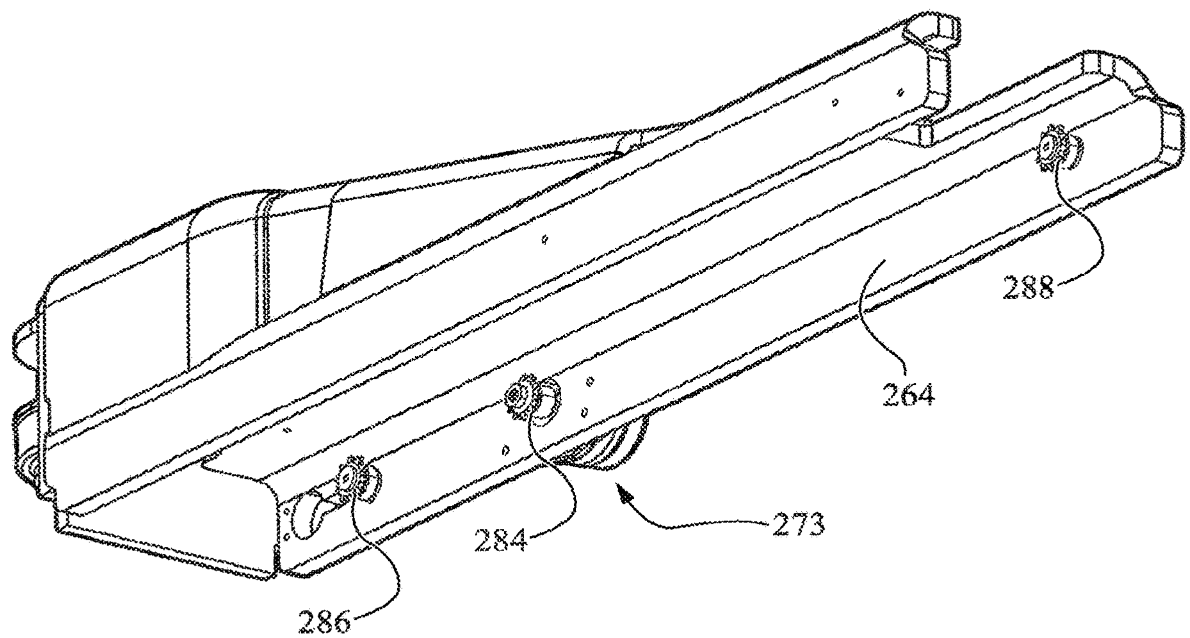
FIG. 18C is a bottom perspective view of the outer arm with a cover removed to show an exemplary extension gear set.

To provide additional context, FIG. 18C shows a bottom perspective view of an interior of the inner arm sheath (264), with a bottom cover removed. The drive gear (284) can be seen within the inner arm sheath (264) where the extension assembly (273) is installed. Mounted along the same inner sidewall of the inner arm sheath (264) are a tension gear (286) and a distal gear (288). A gear chain (not pictured) may be installed within the inner arm sheath (264) with a first end attached to the tensioner gear (286) and a second end attached to the distal gear (288), and with a mid-portion of the gear chain attached to the drive gear (284). Tensioner gear (286) may be loosened from the exterior of the inner arm sheath (264) and moved laterally along the length of the inner arm sheath (264) to adjust and maintain tension on the gear chain when installed. In this manner, extension motor (272) may be operated in a first or second direction to cause the drive gear (284) to correspondingly rotate, thereby causing the gear chain to rotate in the first or second direction. The gear chain may be statically attached to the inner arm (218) which rests within the inner arm sheath (264), such that as the gear chain rotates in a first direction force is transferred to the inner arm (218) causing it to slide along and extend from the inner arm sheath (264). As the gear chain rotates in the second direction, force is transferred to the inner arm (218) causing it to slide along and retract into the inner arm sheath (264). Variations on the use of a gear chain and gears include a rack and pinion, which may provide a more durable system for extending the inner arm (218) as compared to a gear and chain system, but which may have a higher maintenance cost to prevent debris from gathering in the teeth of the rack. Other variations exist and will be apparent to one of ordinary skill in the art in light of this disclosure, with choice of a particular variation depending upon the desired application (e.g., balancing longevity versus maintenance cost).

The exemplary lift arm discussed above may be advantageously combined with the lift automation system (10) due to its flexibility and range of adjustment (e.g., rotation, extension, and elevation of the adapter), but it should be understood that the lift automation system (10) may be used with a variety of lift arms. For example, in some implementations, the lift automation system (10) may be used with lift arms that do not allow for elevation of the adapter independent of a lift post, but which still capture image data and sensor data via devices such as the adapter camera (260), profile camera (230), and the lift sensors (128). In some implementations, lift arms may support a variety of ranges of motion, but may not have one or more of a profile camera (230), an adapter camera (260), or any lift sensors (128).

While not explicitly shown, it should be understood that the inner arm (218) and the outer arm (216) contain additional components such as wiring, cabling, circuit boards, smooth lubricated slide rails or surfaces, and other features required to enable the disclosed capabilities, features, and movements. For example, it will be apparent to one of ordinary skill in the art in light of this disclosure that the inner arm (218) may advantageously rest on or be supported by a smooth rail or other surface within the outer arm (216), or it may be supported by rollers, bearings, or other structures, to reduce the forces needed to extend and retract the inner arm (218) from and into the outer arm (216). Similarly, it will be apparent to one of ordinary skill in the art in light of this disclosure that various electronic or data connections may be present within the lift arm (206), for example, a cable running from the lift controller (120) through the length of the lift arm (206) to provide power and data communication with the profile camera (230) and the adapter camera (260), as well as any lift sensors (128) or other lift cameras (126). As another example, electronic or data connections may run from the lift controller (120) to the rotation motor (270), the extension motor (272), the actuator (244), or the pawl release device (e.g., a lock release cylinder, actuator, automatic cable tensioner, or other device that may retract a cable or other linkage and cause the pawl (234) to release from the pawl catch (238)).

III. Exemplary Method for Lift Automation

With reference to FIG. 2, a lift arm such as that disclosed above may be operated in numerous ways, including manually by use of a set of input devices present at the lift controller (120), through use of a lift monitor device (110), or with a similar device. Additionally, the disclosed lift arm, and others, may also be operated automatically or semi-automatically based upon data and feedback gathered from sensors and other devices, such as the lift sensors (128), the lift cameras (126), the profile camera (230), and the adapter camera (260). Such automatic or semi-automatic operation may advantageously allow lift arms to be positioned at vehicle lift points more accurately, more quickly, and with a reduced need for visual spotting, repeated adjustment, and prone observation, which can significantly improve the overall safety and efficiency of such procedures.

Figure 19:
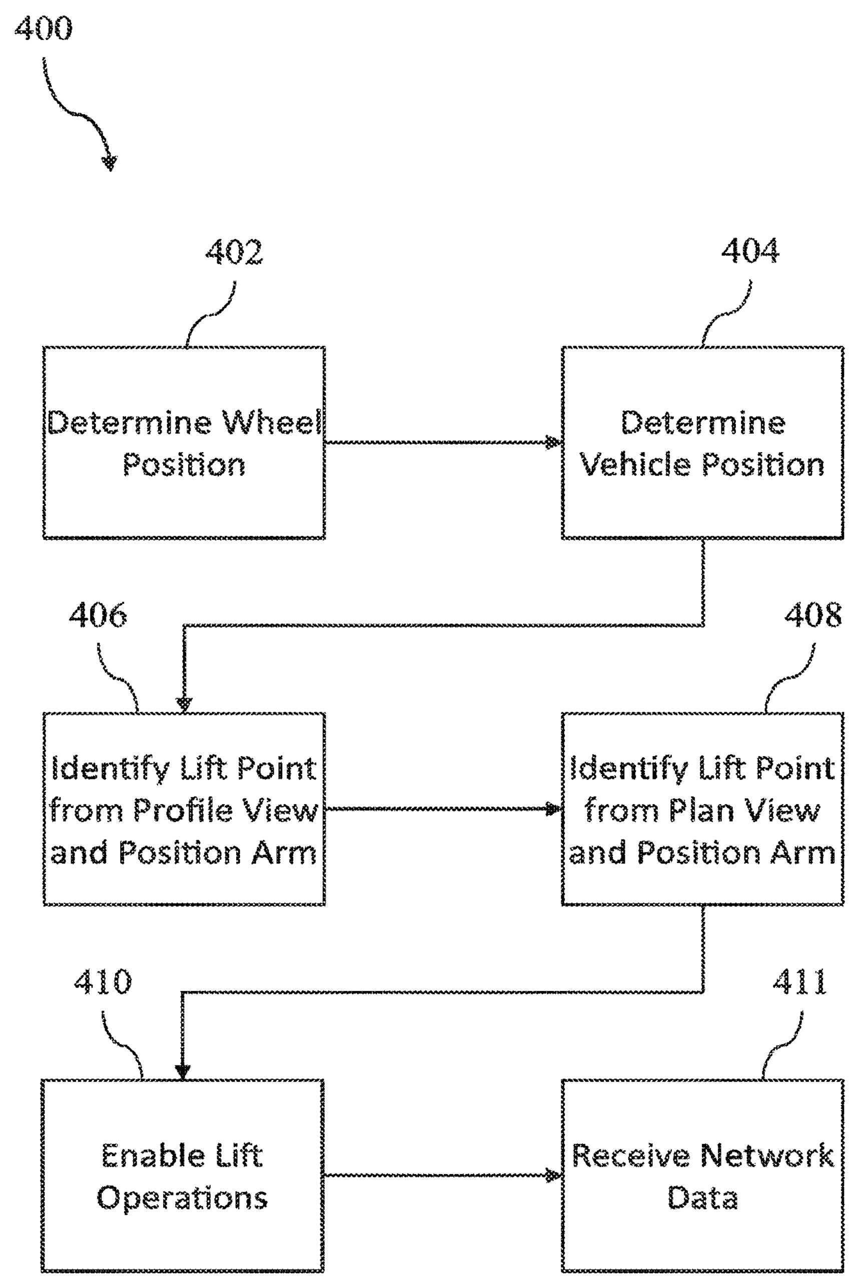
FIG. 19 is a flowchart of an exemplary set of high-level steps that could be performed with the lift automation system to automatically position a vehicle lift for lifting a vehicle.

Automation or semi-automation of such tasks may be performed by a system such as the lift automation system (10), using methods and processes such as one or more of those described in FIGS. 19-31. Turning now to FIG. 19, that figure shows a flowchart of an exemplary set of high-level steps (400) that could be performed by a system such as the lift automation system (10) to automatically position a vehicle lift, such as the lift system (114) or the vehicle lift (200), for lifting a vehicle. Using the vehicle lift (200) and the structures in FIGS. 1-3 as an example, as a vehicle enters the vehicle area (202), one or more of the lift cameras (126) and lift sensors (128) may be active and will begin to track and gather information on the vehicle that may be used to guide the vehicle to an acceptable position within the vehicle area (202). As discussed in further detail herein, this may include determining (402) the wheel position of one or more wheels of the vehicle by, for example, capturing images of the vehicle using the lift cameras (126) and performing image analysis to identify the one or more wheels within the image, and determine an x-direction position of the one or more wheels relative to the lift posts (122, 130) or other fixed or known point in the lift area. With the position of one or more wheels known, one or more lift sensors (128) may be activated in order to determine (404) a y-direction position of the vehicle relative to the lift posts (122, 130), as well as an angle θ of the vehicle relative to the lift post (122, 130), the combination of all of which can be used to completely virtualize the position of the vehicle within the vehicle area (202). When used herein, virtualization can be understood to mean the capture, determination, and/or creation of a set of data that describes real-world objects, particular circumstances, or relevant characteristics of an object in a manner that can be processed and interpreted by a digital system.

When the lift automation system (10) has fully determined (404) and virtualized the vehicle's position within the vehicle area (202), it may identify (406) one or more lift points on the vehicle based upon a profile view (e.g., from the profile camera (230)) and position one or more lift arms based upon the identified lift points. Once one or more lift points are identified (406) from a profile view, and the system may identify (408) one or more lift points from a plan view (e.g., from the adapter camera (260)), and further position one or more lift arms based upon the identified lift points. With the one or more lift arms safely positioned at the one or more lift points, lift operations may be enabled (410) to allow the lift arms to be raised and lowered along the lift posts by a user. The lift automation system (10) may also receive (411) sets of network data from distributed sensors within the network, such as the lift sensors (128, 136) and other devices located at the user sites (102, 104, 106), which may be stored by the identification server (100).

The sets of network data may include captured images and image data, but they may also include information about the dimensions and spatial characteristics of a vehicle, such as proximity data captured by LIDAR sensors of the lift sensors (128, 136). Such data may be used by the identification server (100) to build datasets describing vehicle length, width, axle track, wheelbase, and other characteristics. Such datasets may be associated with a particular model, year, and type of vehicle, and may augment or replace such specifications provided by the manufacturer. They may likewise be associated with a particular vehicle by VIN number or other unique identifier, where a vehicle has been modified from its original specification in some way. Data describing the dimensions and other characteristics of types or vehicles or particular vehicles may be useful in the detection and orientation of a vehicle within the vehicle area (202), as will be described in more detail below. While the data gathered from the distributed network of sensors may be useful for automation of lifts, it should be understood that it need not be gathered from a vehicle lift, vehicle carrier, or other structure capable of automation, as the gathering of the sensor data can be performed independently of any automation features.

Figure 20:
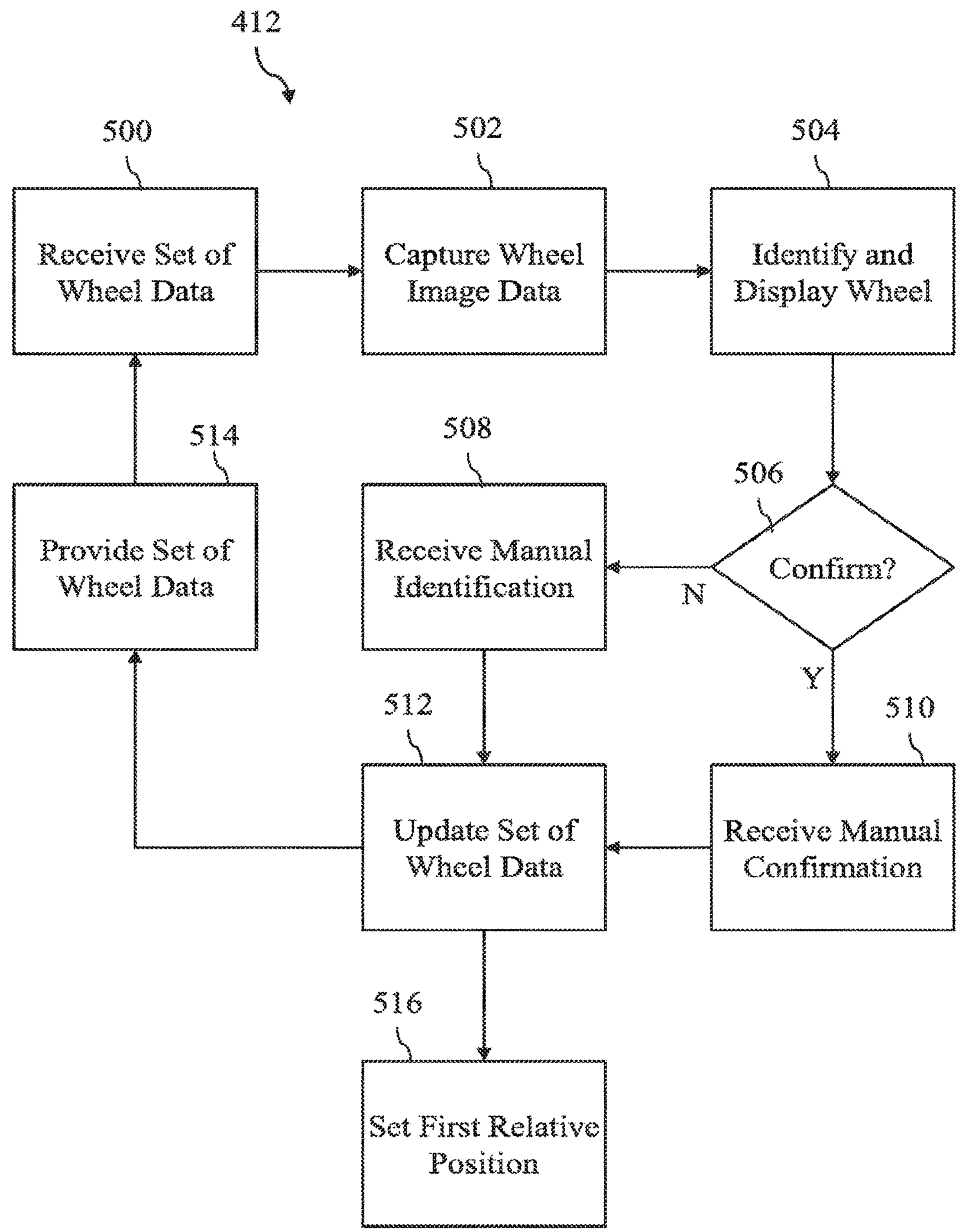
FIG. 20 is a flowchart of an exemplary set of steps that could be performed with the lift automation system to determine a first relative position of the vehicle to the vehicle lift.

Exemplary implementations of one or more of the steps of FIG. 19 will be described in more detail below, for example, FIG. 20 shows a flowchart of an exemplary set of steps (412) that could be performed with a system such as the lift automation system (10) to determine a first relative position of the vehicle to the vehicle lift. The site server (108) or another device or system (e.g., the lift controller (120), the lift monitor device (110)) may receive (500) a set of wheel data from the identification server (100), which may comprise software, data, text, images, structural models, sensor data models, artificial intelligence or machine learning (AI/ML) models, and other information from the wheel dataset (101) that indicate or describe various characteristics of wheels. The set of wheel data may be, for example, a software application that may be executed to perform image analysis on images in order to identify wheels; may be a set of data usable by image analysis, or AI/ML software to perform the same; or may be information usable to build such a set of data. Such information may include, for example, image sets showing various sizes, colors, positions, and other visual characteristics of wheels, tires, hubcaps, rims, and surrounding areas where wheels are located on a vehicle, from various distances and in various lighting, and may also include sets of metadata associated with the image sets indicating, for each image or for sets of images, the positive identification of a wheel, a location or area of the image indicating the position of the wheel, and the circumstances in which the image was captured (e.g., lighting characteristics, outdoor vs. indoor, type of image capture device, etc.). In some embodiments these source images are included with the resulting model data, while in others the images are omitted.

The set of wheel data may be produced from image sets that include both positive images (e.g., images that have been automatically or manually verified as properly identifying a wheel) as well as negative images (e.g., images that automatically but erroneously identified a wheel, or that manually identified an object that is not a wheel). The set of wheel data may be received (500) and stored locally at the user site (102) from time to time, as it will update and improve over time, as will be described in more detail below. When a vehicle enters the vehicle area (118, 202), the vehicle lift (114, 200) may capture (502) wheel image data from the vehicle in real time (e.g., via devices such as the lift cameras (126), the profile camera (230), or others). The set of wheel data and the captured wheel image data may then be used to identify (504) and display a wheel within the captured wheel image data. This may be accomplished using image analysis and comparison that may, for example, apply abstracted image analysis procedures directly to image data (e.g., in a case where the set of wheel data is a software application or algorithm usable by an application), or may compare various frames of the captured wheel image data to the sets of wheel images within the set of wheel data and, based upon the associated metadata, find visually similar images that suggest the presence or absence of a wheel (e.g., in a case where the set of wheel data comprises images and associated metadata).

When a wheel is identified (504) within the captured image data, the captured image data may be displayed as an image or set of images in near real-time via a device such as the lift monitor device (110) with an overlaid boundary, box, circle, or other visual indicator identifying the putative location of the wheel within the captured image data. Image data may also include indicators that the wheel is or is not in an acceptable position within the vehicle area (202), which may aid in initial positioning of the vehicle within the vehicle area (202). For example, in some implementations, a user may be driving a vehicle into the vehicle area (202) and may possess the lift monitor device (110), or may be assisted by another user possessing the lift monitor device (110), or may be able to see a display or other visual indicator showing the information and/or indicators. Upon initially positioning the vehicle within the vehicle area (202), the user may view captured image data on the lift monitor device (110).

Captured image data may be displayed as an image, with a green box indicating an identified wheel that is in a proper position within the vehicle area (202) (e.g., a position where the lift arms are likely to be able to reach various lift points under the vehicle), or a red box indicating an identified wheel that is not in a proper position within the vehicle area (202) (e.g., a position where one or more lift arms cannot reach a lift point, or where the vehicle may be unbalanced during lifting). In addition to providing comparisons to particular wheels for identification, metadata associated with the wheel data set may also provide comparisons to those wheels or other wheels in proper positions within the vehicle area (202) that allow for the vehicle to be safely lifted by the vehicle lift (200).

Identification (504) and display of the wheel may also allow a user to provide a confirmation (506) that the identified portion of the captured image data is a wheel. In such implementations, a user may view the identified (504) wheel on the lift monitor device (110) and, where the visual indicator of the wheel is correctly placed, may provide a manual confirmation to be received (510) by the system. This may include, for example, clicking a button or other interface element, tapping the visual indicator on a touchscreen display, or other inputs. Where the visual indicator of the wheel is not correctly placed (e.g., where visual analysis of the captured image data shows that the identified portion of the image is a false positive for wheel location), the user may provide a manual identification of the location of the wheel in the image data to be received (508) by the system. Manual identification may be provided in various ways, including by selecting a circle or box with a mouse or other pointer, by selecting segments of the image that contain portions of the wheel, by dragging the visual indicator using a mouse or touchscreen display to an area within the captured image data that does contain a wheel, or other inputs. When it is determined that the wheel or other target object is present in the image, a positive image descriptor is associated with the image, the combination being a positive identification, whether the determination is done automatically or by a person.

In either case, the received (510) manual confirmation or the received (508) manual identification, and the associated captured image data, may be used to update (512) the set of wheel data, and provide (514) the updated set of wheel data to the identification server (100), where it can be saved to the wheel dataset (101) for inclusion in future sets of wheel data that are provided to users of the system or similar systems. Updating (512) may include, for example, providing the results or output of image analysis (e.g., a captured image and an identified portion of the image), and may also include diagnostic and other information related to the performed image analysis. Identification server (100) may update its AI/ML to reflect the received (508) manual identification or received (510) manual confirmation. In this manner and operating over time the lift automation system can, based upon user feedback and training in the form of received (510) confirmations and received (508) identifications, refine and improve the wheel dataset (101) in order to produce more efficient and accurate automatic identification of wheels within the vehicle area (202) and, thus, more efficient and accurate determination of the location of vehicles' lift points. The provided (514) sets of wheel data may be used for additional purposes beyond identification of wheels, including, for example, identification of lugs nuts on a wheel, inflation levels of wheels, and other characteristics related to the wheel and tire.

As will be apparent to one of ordinary skill in the art in light of this disclosure, steps such as those described above may be implemented and performed in various ways. For example, while FIG. 20 describes an implementation where the user site (102) locally stores the set of wheel data and locally performs image analysis and identification of wheels with a device such as the site server (108), lift controller (120), or lift monitor device (110), such steps may also be performed by the identification server (100). Each scenario provides advantages, as storing and processing data locally allows such a system to operate offline or with limited connectivity with the identification server (100), while storing and processing data at the identification server (100) allows for improved image analysis datasets to be created and applied more immediately. As another example, in some scenarios the user site (102) may have image analysis software that downloads and locally stores the set of wheel data to use for subsequent analysis, while in others the software may run remotely (e.g., on the identification server (100)) and may receive captured image from the user site (102) and provide results.

Figure 21:
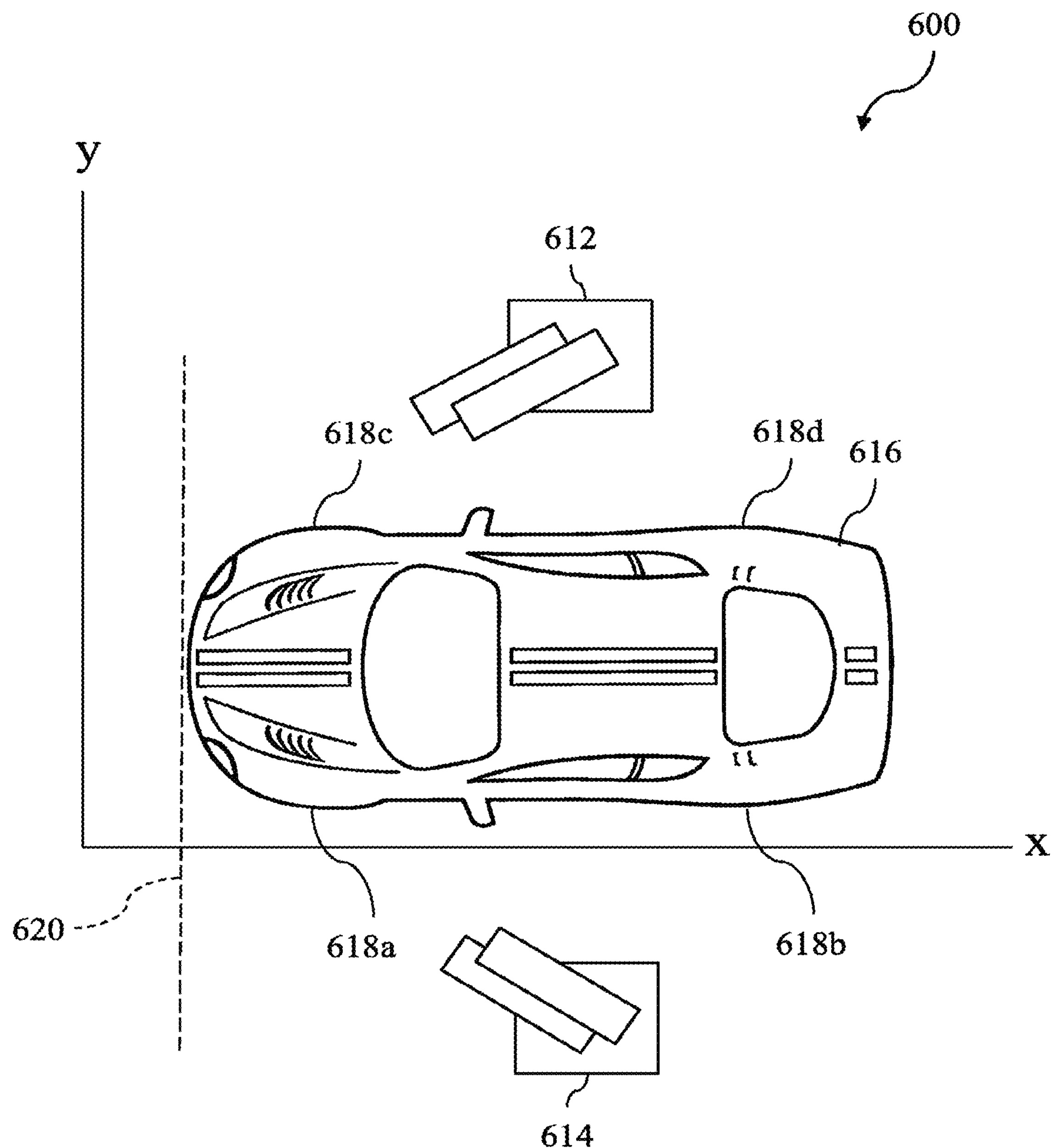
FIG. 21 is a schematic diagram showing a virtualized view of the vehicle lift and the vehicle during determination of the first relative position.

With a wheel identified (504) and confirmed (508, 510), the system may also set (516) a first relative position of the vehicle within the vehicle area (202) for purposes of virtualizing the vehicle area (202). As an example, FIG. 21 shows a schematic diagram representing a virtualized view (600) of the vehicle lift area and the vehicle during determination of the first relative position (516). At this stage of virtualization, the system may know the positions of a lift arm (612) and a lift arm (614), as well as the distance between the lift arms and the general dimensions of the vehicle lift area. The system may know that a vehicle (616) is within the lift area and, based upon identification (504) of one or more wheels, may know an approximate location of those wheels (618*a*, 618*b*, 618*c*, 618*d*). In some implementations, all of the wheels may be identified, while in others fewer than all of the wheels may be identified. For example, if the front driver side wheel (618*a*) is identified, and the lift system (114) has been configured with information identifying the vehicle (616) type and characteristics, it may be determined where the wheel (618*a*), the front of the vehicle (616), or both are located along an x-dimension, giving a first coordinate position in the lift area, relative to the lift posts (612, 614), as shown in FIG. 21. This x-dimension position (620) relative to the lift post (612, 614) is shown in FIG. 21 and is set (516) as the first relative position. Position determination may also use known reference distances, which may be configured based upon a post's installation specification, or may be configured based upon measurement after installation, and which characterize the relationship of the camera orientation to the floor of the vehicle area (202) and lift structures such as arm rotational points at the post connections (217).

It should be noted that, while this description illustrates use of a wheel as the first target point on the vehicle by which image analysis yields location information useful for virtualizing the vehicle in the lift area, other target points on the vehicle suitable for such imaging, analysis, and location will occur to those skilled in the art in view of this disclosure.

Figure 22:
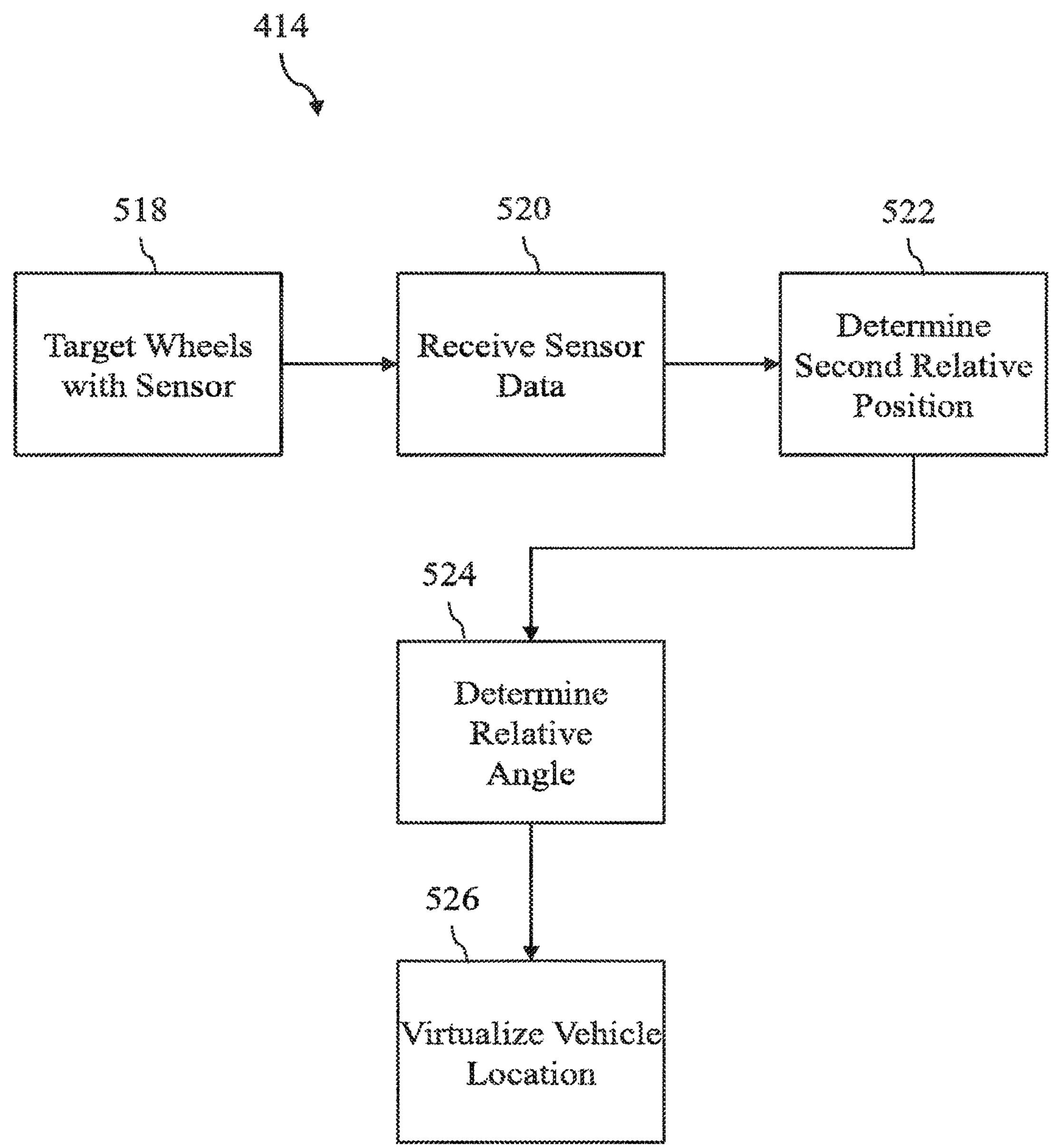
FIG. 22 is a flowchart of an exemplary set of steps that could be performed with the lift automation system to determine a second relative position and a relative angle of the vehicle to the vehicle lift.

With the first relative position, a set of steps (414) such as those shown in FIG. 22 may be performed to determine a second relative position (622), or second coordinate position in the lift area, and a relative angle (0) of the centerline of the vehicle to the centerline of the vehicle area (118) (that centerline being the perpendicular bisector of a segment connecting lift posts (612, 614)) or another desired centerline as will occur to those skilled in the art. This may include targeting (518) one or more identified wheels or other target points with one or more sensors of the lift sensors (128) to determine their location in the y-dimension. Sensors and sensor technology used may include, for example, light detection and ranging ("LIDAR") or other optical or photoelectric sensing; ultrasonic proximity sensing; wireless triangulation; triangulation based on multiple image sensors, proximity sensors, or other sensors; and other similar technologies that allow the direction and/or distance of an object to be detected. Such sensors may be statically mounted on one or both of the lift posts (612, 614) or elsewhere in the lift area, or they may be electronically adjustable such that they can be automatically targeted at wheels as they are identified.

Figure 23:
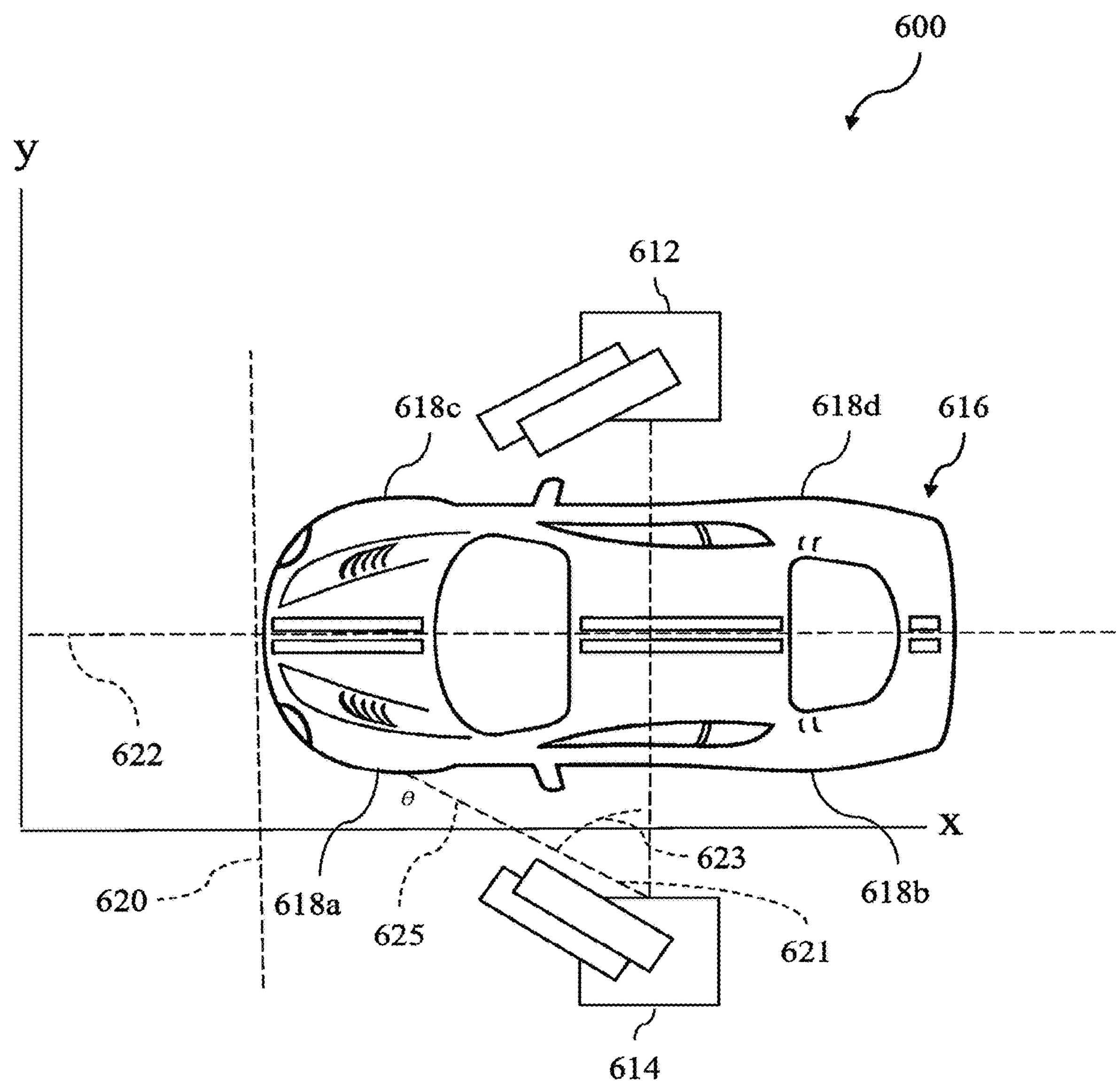
FIG. 23 is a schematic diagram showing a virtualized view of the vehicle lift and the vehicle during determination of the second relative position.
Figure 24:
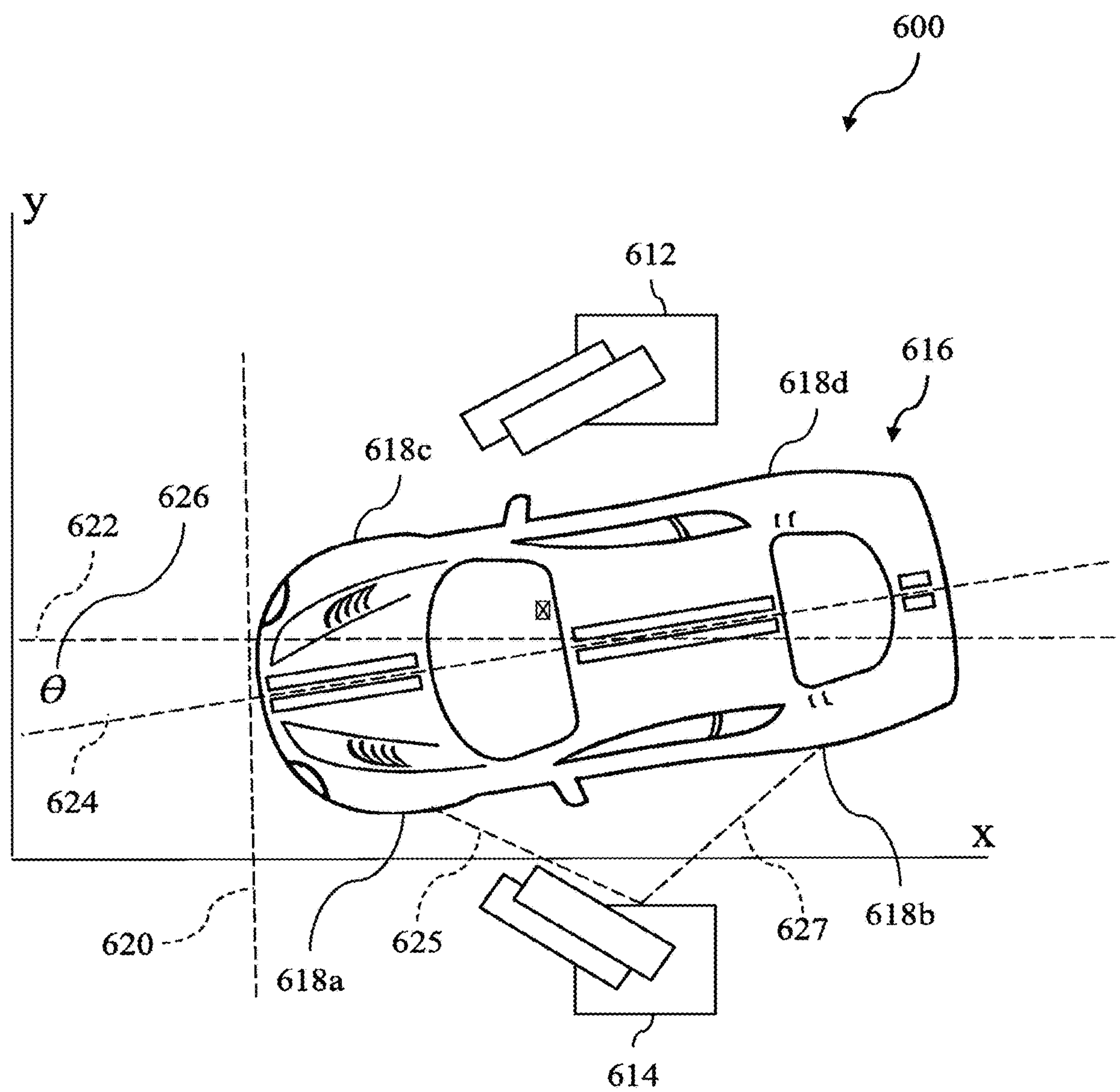
FIG. 24 is a schematic diagram showing a virtualized view of the vehicle lift and the vehicle during determination of the angle of the vehicle.

Sensor data may be received (520) and used to determine (522) a second relative position of the vehicle (616) (e.g., its position along the y-dimension) and to determine (524) a relative angle of the vehicle (616) (e.g., whether its longitudinal axis is rotated relative to the x-axis). With reference to FIG. 23, determination (522) of the vehicle's second relative position may be performed, for example, by using a sensor such as LIDAR sensor or other sensor positioned on the lift post (614) to determine the distance (625) from the lift post (614) to the wheel (618*a*) based upon data generated by the LIDAR sensor from a sensing beam (621) and determining the angle (623) between the LIDAR sensor beam (621) based upon the sensor's connecting the lift posts (612, 614). While FIGS. 23 and 24 show and describe LIDAR or another sensor being positioned at the lift post (614), it should be understood that the lift post (612) may be similarly configured. In such an implementation, LIDAR located at each lift post (612, 614) may be used to identify points of the vehicle (616) from each side of the vehicle rather than from a single side. This may advantageously provide more accurate information about the vehicle's (616) position and orientation, and it may also account for vehicles that may be damaged or modified such that standard specifications on width, length, and wheel placement do not accurately represent the vehicle in its current state.

Determination (522) of the y-direction position (622) may be performed as described above for one or more wheels (618*a*, 618*b*, 618*c*, 618*d*), though results may be more accurate if performed on at least two or more wheels (e.g., wheel 618*a* and wheel 618*b* or wheel 618*b* and wheel 618*c*). Determination (524) of the relative angle θ may be similarly performed by determining the distances (625, 627) between the lift post (614) and each of two or more wheels (e.g., wheel 618*a* and wheel 618*b*), as shown in FIG. 24, which along with information (such as the standard distance between front and rear wheels for a given model of vehicle from wheel dataset (101), lift point dataset (103) or other data source as will occur to those skilled in the art) may be used to virtualize the orientation (624) of the vehicle (616) within the lift area and relative to the lift post (614). With the x-direction position (620), y-direction position (622), and orientation (624) known, the vehicle's location (i.e., position and orientation) within the vehicle lift area can be fully virtualized (526). Once virtualized (526), other aspects of the vehicle (616) may be incorporated to provide additional information to the system, such as where a vehicle has been configured or identified to the system by its make, model, VIN number, or other information, which can be used to identify standard information associated with the vehicle that may enrich the virtualization and verify its accuracy. Such additional information may include, for example, the known distance between wheels (e.g., between wheel 618*a* and wheel 618*c*, or between wheel 618*a* and wheel 618*b*), the length of the vehicle, the width of the vehicle, and the locations of standard lift points for the vehicle.

Figure 25:
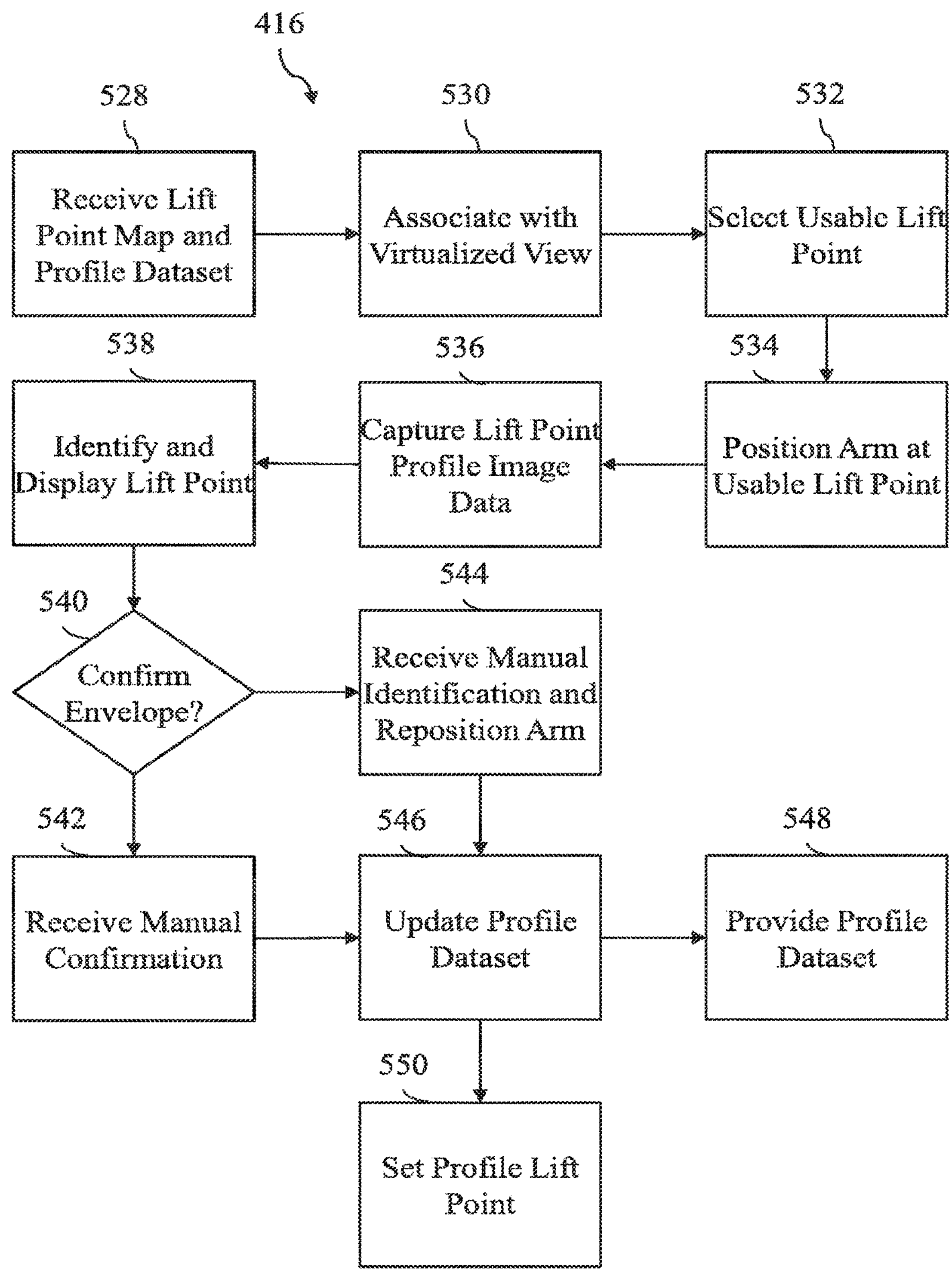
FIG. 25 is a flowchart of an exemplary set of steps that could be performed with the lift automation system to position a lift arm based upon profile identification of a lift point.

With the vehicle (616) virtualized (526), and information available such as the locations of one or more lift points of the vehicle (616), the system may begin to automatically position one or more lift arms for engagement with the one or more lift points. As an example, FIG. 25 shows a flowchart of an exemplary set of steps (416) that could be performed with the lift automation system (10) to position a lift arm based upon profile identification of a lift point. A lift point map and a profile dataset may be received (528) from the identification server (100) or the lift point dataset (103).

Figure 26:
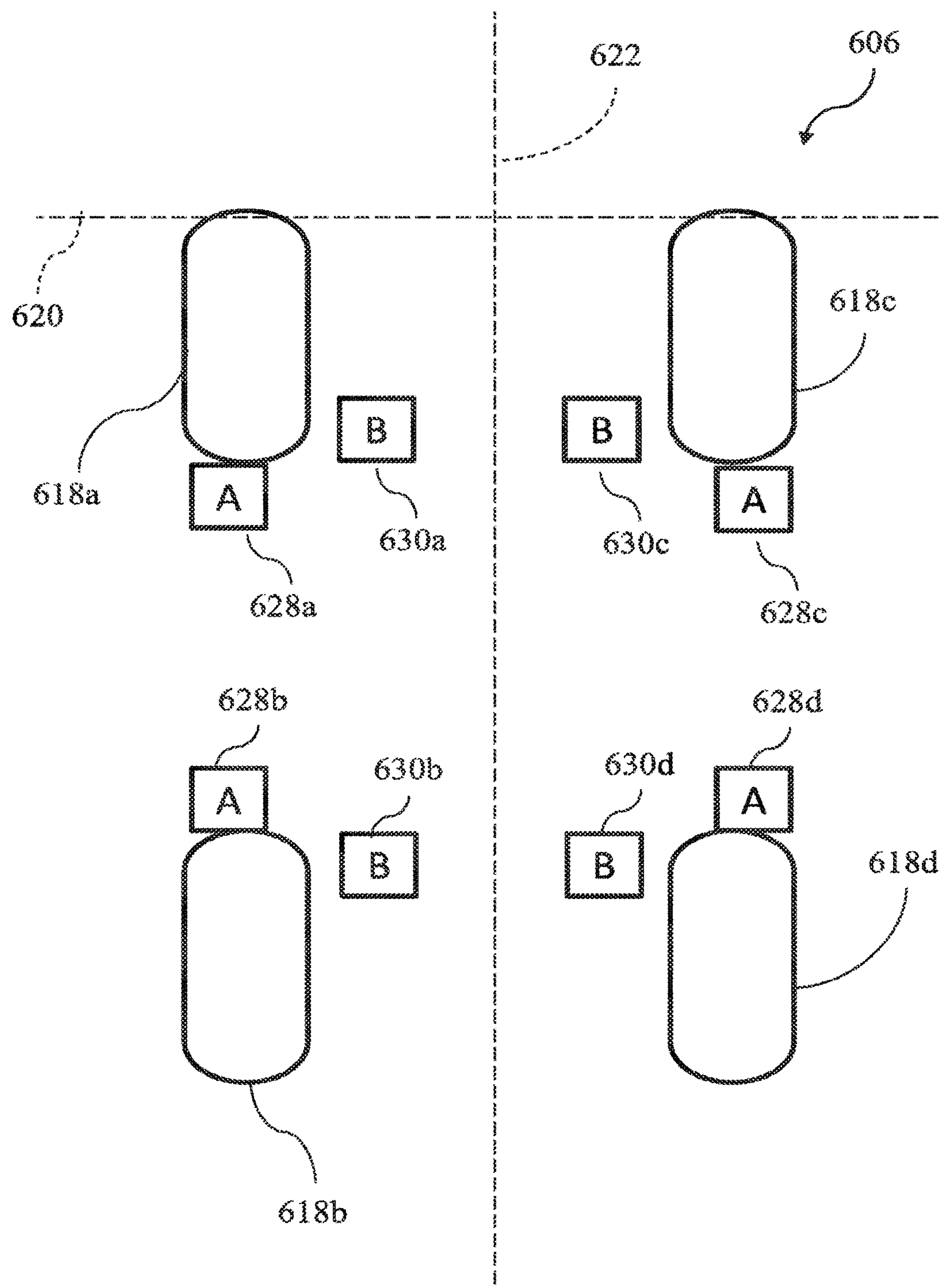
FIG. 26 is a schematic diagram showing a virtualized view of a set of exemplary lift points of the vehicle.

The lift point map may be determined based upon an identified vehicle. For example, the make, model, year, and other characteristics of a vehicle are typically known prior to service and may be provided to the lift automation system (10) as part of configuring the system for use with the vehicle and/or from one of wheel dataset (101), lift point dataset (103) or other data source as will occur to those skilled in the art. Where a vehicle cannot be identified for some reason, a lift point map may be determined based upon the type of vehicle (e.g., a car, a truck, a van) or other more general information, which may not indicate the precise location of lift points, but which may suggest a general location where lift points may be found. As an example of a lift point map, FIG. 26 shows a virtualized view of a set of exemplary lift points as a lift point map (606) of a vehicle such as the vehicle (616), which shows a set of outer lift points denoted as A (628*a*, 628*b*, 628*c*, 628*d*) and a set of inner lift points denoted as B (630*a*, 630*b*, 630*c*, 630*d*).

The profile dataset may have similar types of content and organization as the set of wheel data, in that it may be a software application, or may be a set of data usable by a software application (e.g., an image analysis rule set, algorithm, heuristic, AI/ML data, or other model), or may contain various types of textual and image information. However, the profile dataset will instead contain information associated with and describing vehicle lift points and characteristics of vehicle lift points. Such information may include, for example, image sets showing side profile views of various sizes, shapes, colors, positions, and other visual characteristics of vehicle lift points and surrounding areas of vehicles, and may also include sets of metadata associated with the image sets indicating, for each image or for sets of images, the positive identification of a lift point, an area of the image indicating the position of the lift point, and data regarding the circumstances in which the image was captured (e.g., lighting, outdoor vs. indoor, type of image capture device). As with the set of wheel data, the profile dataset may include or may be built upon both positive images (e.g., images of lift points that have been automatically or manually verified as properly identifying a lift point) as well as negative images (e.g., images that automatically but erroneously identified a lift point, or that manually identify an object that is not a lift point).

With the virtualized view (600) of the lift area and the profile dataset, the lift point map may be associated (530) with the virtualized view (600) so that the system may automatically select (532) or suggest one or more usable lift points for lifting the vehicle (616). Referring again to FIG. 26, this association is indicated by the overlay of the x-direction position (620) and the y-direction position (622) and, while not shown in FIG. 26, may also account for the orientation (624) or angular offset of the vehicle (616) within the lift area. With the virtualized view (600) and associated lift point map (606), the system may select any lift point, such as the outer lift point (628*a*), and may determine an x-direction coordinate and y-direction coordinate at which the lift point (628*a*) is located. Since the coordinate locations of the lift posts (612, 614), attached lift arms, and other objects are also known by the system, the lift arms may be automatically positioned relative to the lift point (628*a*). Selection (532) of usable lift points may occur based upon various preferences (e.g., a preference for inner lift point (630*a*) over outer lift point (628*a*), or vice versa), mechanical limits of the lift arms (e.g., where the vehicle (616) is at an angle within the lift area such that a lift arm can reach the lift point (628*a*), but cannot reach the lift point (630*a*)), manufacturer preferences (e.g., where a specific vehicle type has ideal lift points specified by the manufacturer), or manually (e.g., based upon user inputs).

Figure 27:
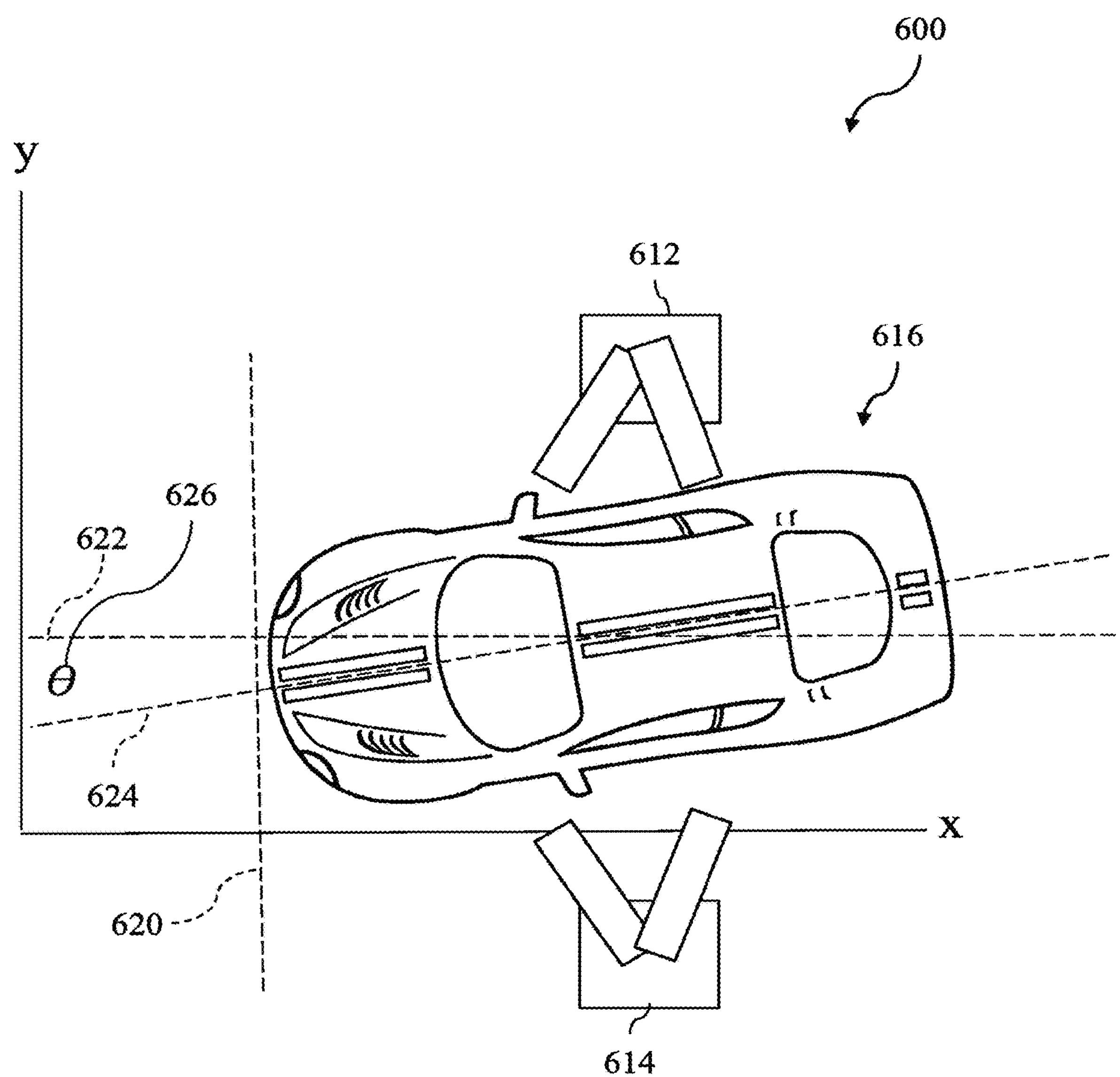
FIG. 27 is a schematic diagram showing a virtualized view of the vehicle lift and the vehicle during positioning of the lift arm based upon profile identification of the lift point.

Once selected (532), the vehicle lift may automatically position (534) one or more lift arms at a position where a camera such as the profile camera (230) on the lift arms can capture live image data of the selected (532) lift point. For example, this may include rotating a lift arm around the lift post (614) so that the lift arm is directed toward the selected (532) lift point (e.g., where the profile camera (230) is positioned on the adapter of the lift arm such that its field of view runs parallel to the length of the lift arm), extending the lift arm to position the profile camera (230) close enough to the lift point to capture acceptable quality image data, and in some implementations activating a spotlight or other light source to illuminate the selected (532) lift point. Once positioned (534), profile image data of the lift point may be captured via the profile camera (230). FIG. 27 shows the virtualized view (600) at this stage, and it can be seen that the lift posts (612, 614) have positioned the lift arms automatically at the selected (532) lift points so that profile image data may be captured.

As with the set of wheel data and the captured wheel image data, the lift automation system (10) may then perform image analysis to identify (538) and display a lift point within the captured profile image data. Identification (538)

of the lift point in the captured image(s) may be performed by a device such as the lift controller (120), site server (108), identification server (100), or others, as has been described, and the identified (538) lift point may be displayed on a device such as the lift monitor device (110) or another device. As with prior examples, a target area encompassing the identified lift point within the captured profile image data may be visually called out by a box, circle, overlay, highlight, or other indicator, and may also provide a visual identification of the lift arm's position relative to the identified (538) lift point.

Figure 28A:
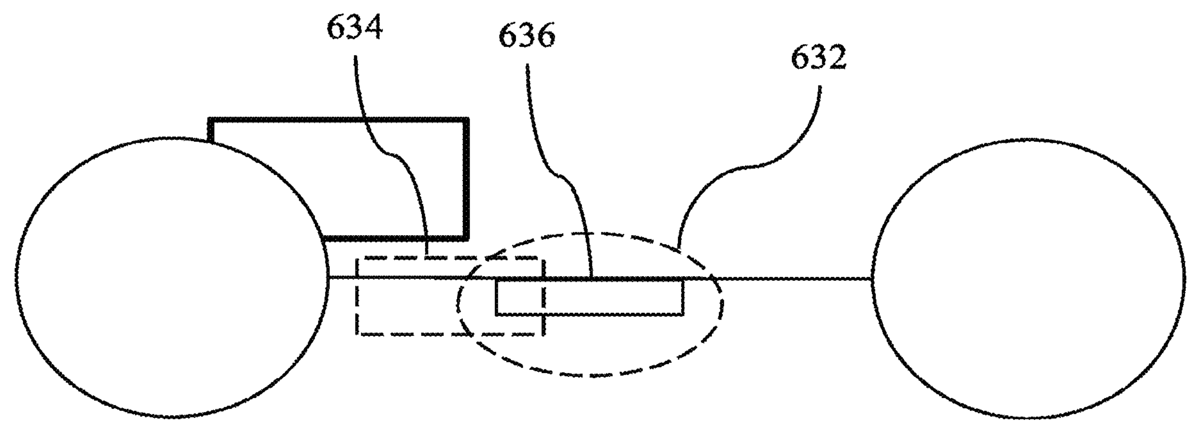
FIG. 28A is a schematic diagram showing a virtualized view of an identified lift point and a target envelope in a first scenario.
Figure 28B:
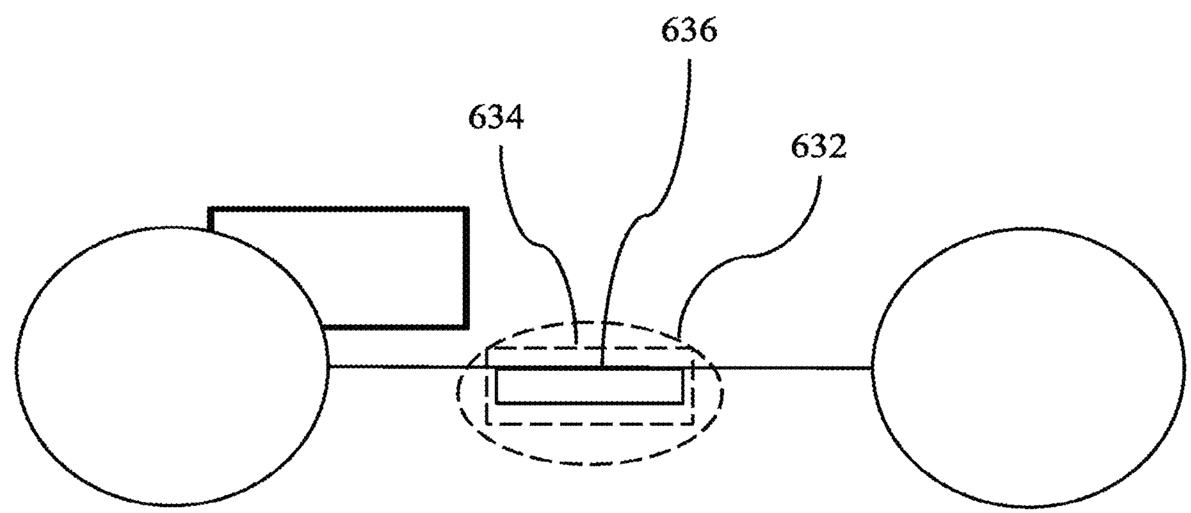
FIG. 28B is a schematic diagram showing a virtualized view of an identified lift point and a target envelope in a second scenario.

FIGS. 28A and 28B show examples of an exemplary annotated view, which may also be presented as a user interface, displayed interface, or other form when displayed on a device such as the lift monitor device (110). For example, in FIG. 28A, an identified lift point (632) is shown as a circle indicating a position of an identified (538) lift point. A lift indicator (634) is shown as a rectangle and indicates a position, direction, or orientation of the viewing lift arm relative to the identified lift point (632). As can be seen, in this example the identified lift point (632) fully contains an actual lift point (636), indicating a successful identification (538). However, the lift indicator (634) is not fully contained within the identified lift point (632), meaning that the lift arm is not in an ideal position for extending to, engaging, and lifting via the lift point (636). The lift automation system (10) may be configured to automatically reposition the lift arm (206) until the lift indicator (634) is within the identified lift point (632) by rotating, extending, or otherwise automatically manipulating the lift arm (206). In other embodiments, this adjustment may be made by a user directly or remotely controlling the lift arm (206).

In contrast, in FIG. 28B with similar captured profile image data, the lift indicator (634) is properly positioned within the identified lift point (632), and the identified lift point (632) contains the actual lift point (636). Such a result indicates both a proper identification (538) of the lift point (636) and an acceptable position of the lift arm (206) and resulting lift indicator (634) relative to the identified lift point (632).

A user may use a view or interface such as that shown in FIGS. 28A and 28B to confirm (540) proper identification and positioning, which may include confirming placement of the identified lift point (632), the lift indicator (634), or both. Confirmation may be received (542) as a manual confirmation from a user indicating, for example, that the identified lift point (632) is correct and fully contains the actual lift point (636), and that the lift indicator (634) is contained within the identified lift point (632), as shown in FIG. 28B. Confirmation may also be received (544) as a manual identification of a lift point, a manual repositioning of the lift arm and target envelope, or both. For example, a user may interact with a view or interface as shown in FIG. 28A in order to drag, select, redraw, or otherwise reposition the identified lift point (632) over the lift point (636), which may result in automatic repositioning of the lift arm and the lift indicator (634) within the identified lift point (632), or may allow the user to manually reposition the lift arm and the lift indicator (632) within the identified lift point (634). In instances where the lift point (636) cannot be automatically identified sufficiently to position the lift indicator (634), that may indicate an issue with the integrity of the lift point, such as damage due to rust or impact against a curb, or where it has accumulated mud, ice, concrete, or other materials that obscure its appearance. In such a case, the user may be warned that the lift point may have an integrity issue that may make it unsafe to use, and the user may have to confirm the warning and select a different lift point, inspect and clean the lift point, or override the warning and manually identify the lift point as described above.

In either case, the received confirmation (542, 544) may be used to update (546) the profile dataset, which may then be provided (540) to the identification server (101) (e.g., as captured images, associated confirmations, updated analysis rules, algorithms, or heuristics) and stored in the lift point dataset (103) for inclusion in future profile datasets. In alternative embodiments, the raw image(s) and information about one or more of the identifications are transmitted to the identification server (101), which integrates the data into one or more models and/or data sets, such as AI/ML models, which may subsequently be transmitted to other users' sites (102). In this manner, multiple users of the lift automation system (10) may, by either confirming an automatic identification and positioning or correcting automatic identification and positioning, provide feedback to the lift point dataset (103) that may be used to grow, improve, and/or refine the lift point dataset (103) and image analysis over time, with a result of faster and more accurate profile identification of lift points. After confirming (540), in either case, the system may set (550) the profile lift point for that lift arm and proceed to subsequent automatic positioning steps for that lift arm.

Figure 29:
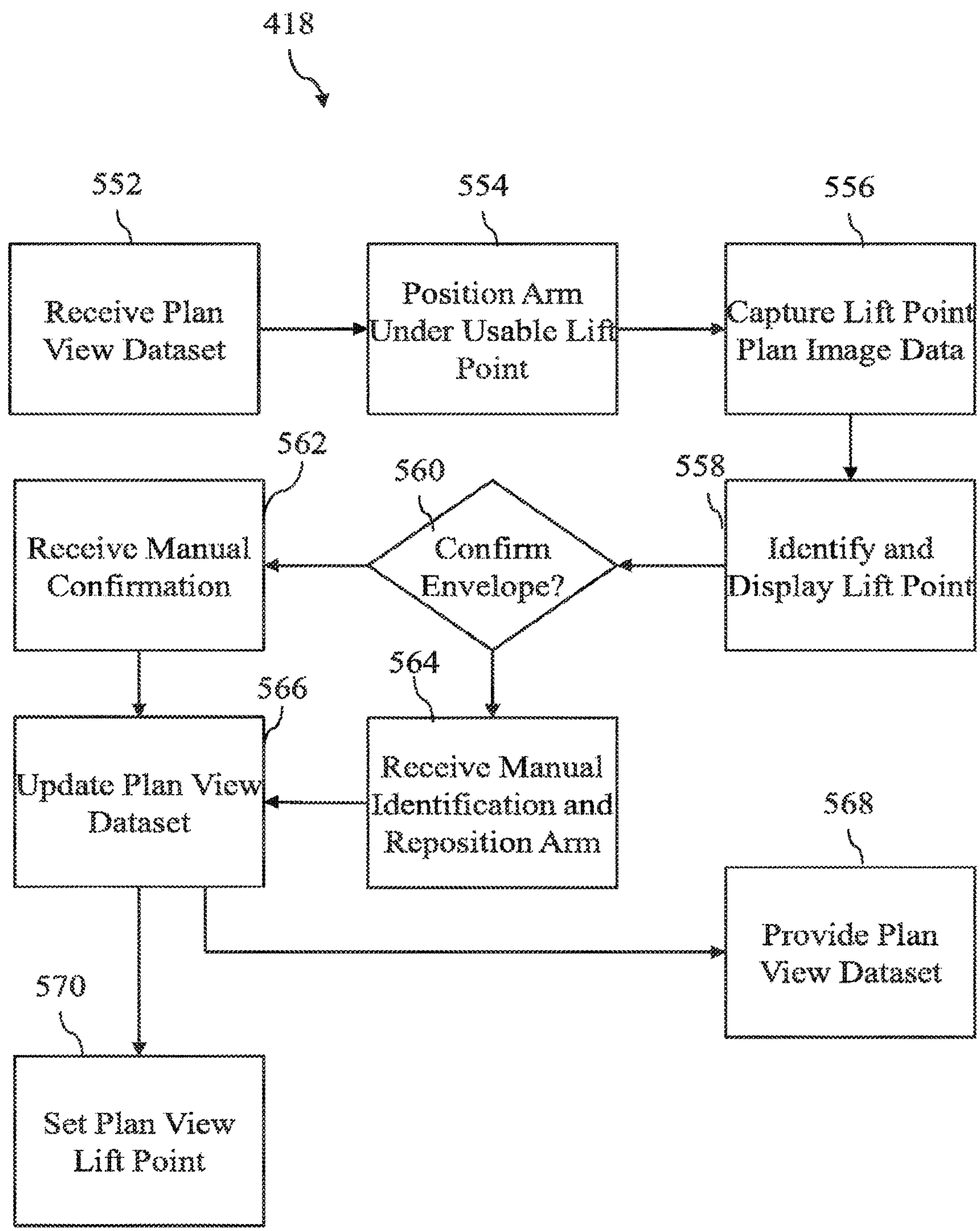
FIG. 29 is a flowchart of an exemplary set of steps that could be performed with the lift automation system to position the lift arm based upon plan-view identification of the lift point.

Turning to FIG. 29, that figure provides an example of subsequent automatic positioning that may be performed by the lift automation system (10). That figure shows a flowchart of an exemplary set of steps (418) that could be performed with the lift automation system (10) to position a lift arm (e.g., lift arms (124), lift arms (206, 208, 212, 214), etc.) based upon plan view identification of the lift point. Plan view identification of the lift point has some similarities to profile view identification, as discussed in the context of FIG. 25, but may view and identify a lift point from a plan view perspective (i.e., substantially or directly below the lift point) rather than a profile view perspective (i.e., from the side of the lift point). Automatic positioning based upon a profile view allows the lift arm to be rotated, extended, or both, to a position near a desired lift point, while automatic positioning based upon a plan view allows the lift arm position to be further refined (e.g., adjustments to rotation or extension, or elevation of an adapter such as with the lift arm (206)) and precisely positioned just below the desired lift point, especially when implemented with an adapter viewpoint camera such as the adapter camera (260), which may be positioned such that the lens (261) is centered on the adapter.

To refine the position of the adapter assembly (220) based upon a plan view, the system may receive (552) a plan view dataset from the identification server (100) and the lift point dataset (103). The plan view dataset may be analogous to the profile dataset in content and organization, and it may include software applications, rules, algorithms, models, AI/ML configurations, and heuristics usable by software applications, or may include images, text, descriptions, and metadata associated with lift points when viewed from below rather than from the side. Such information may include, for example, image sets showing side profile views of various sizes, shapes, colors, positions, and other visual characteristics of vehicle lift points and surrounding areas of vehicles, and may also include sets of metadata associated with the image sets indicating, for each image or for sets of images, the positive identification of a lift point, an area of the image indicating the position of the lift point, and the circumstances in which the image was captured (e.g., lighting, outdoor vs. indoor, type of image capture device). As with the set of wheel data and the profile dataset, the plan view dataset may include or may be created based upon both positive images (e.g., plan view images of lift points that have been automatically or manually verified as properly identifying a lift point) as well as negative images (e.g., images that automatically but erroneously identified a lift point, or that manually identify and object that is not a lift point).

Figure 30:
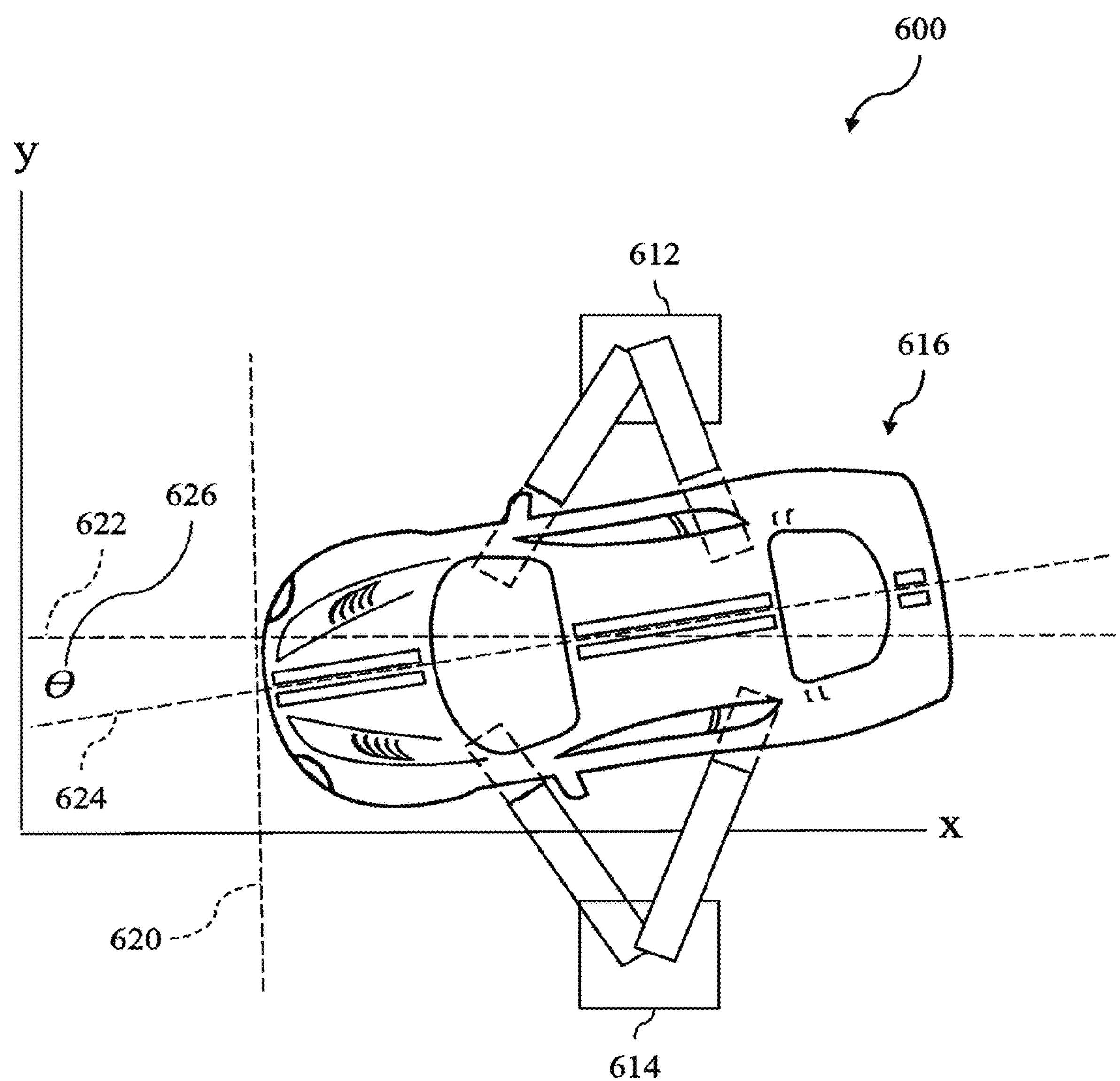
FIG. 30 is a schematic diagram showing a virtualized view of the vehicle lift and the vehicle during positioning of the lift arm based upon plan-view identification of the lift point.

Plan view image data may also be captured (556) via a camera such as the adapter camera (260), which may be positioned directly or substantially below a lift point after being automatically positioned based upon profile images, as shown in the virtualized view (600) of FIG. 30. Similar to identification of wheels and profile lift points, the captured plan view image data and the plan view dataset may then be used to perform image analysis to identify (558) and display lift points from the plan view perspective on any appropriate device of the lift automation system (10) or similar devices. Display of the captured plan view image data and identified (558) lift point may be performed similarly as disclosed in and in the discussion regarding FIG. 25, as shown in FIGS. 31A and 31B.

Figure 31A:
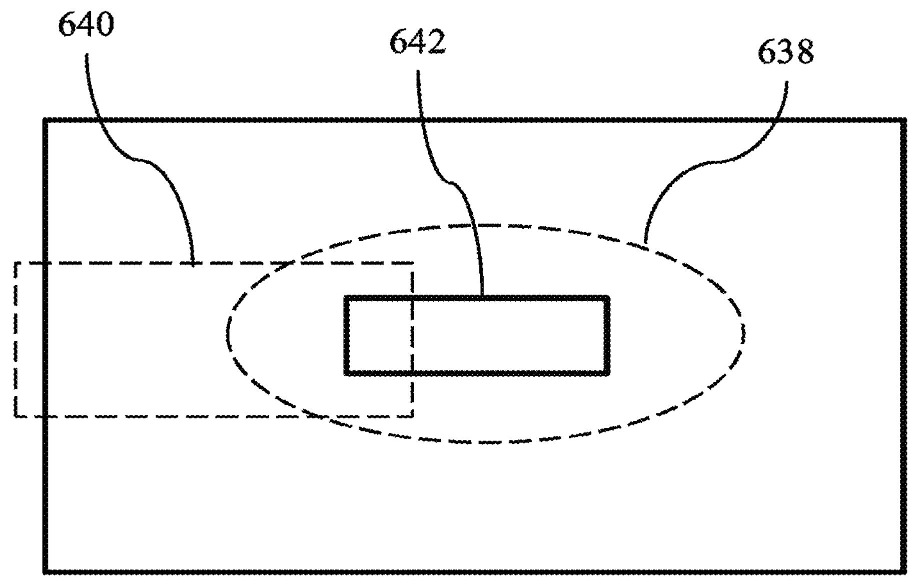
FIG. 31A is a schematic diagram showing a virtualized view of an identified lift point and a target envelope in a third scenario.
Figure 31B:
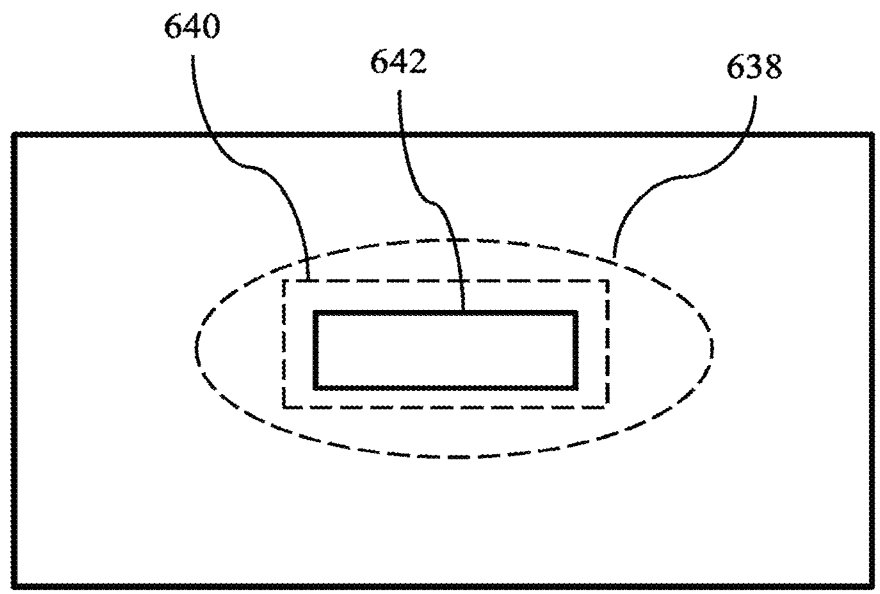
FIG. 31B is a schematic diagram showing a virtualized view of an identified lift point and a target envelope in a fourth scenario.

In FIG. 31A, lift indicator (640) is not positioned within an identified lift point (638), and identified lift point (638) fully contains an actual lift point (642). The lift automation system (10) may be configured to automatically reposition the lift indicator (640) within the identified lift point (638) by rotating, extending, or otherwise automatically manipulating the lift arm, or by elevating the adapter, where possible. In FIG. 31B, the lift indicator (640) is positioned within the identified lift point (638), indicating an acceptable position of the lift arm (206) for lifting and engaging the lift point (642).

As with prior examples, a user may confirm (560) placement of a target envelope via a device such as the lift monitor device (110), and the system may receive (562) a manual confirmation of the identified (558) lift point or may receive (564) a manual identification of the lift point, and conduct a manual or automatic repositioning of the lift arm to align adapter assembly (220) with the lift point (642). As with prior examples, this may include providing a view or interface such as that shown in FIGS. 31A and 31B to allow a user to drag, draw, select, or otherwise reposition the identified lift point (638) or the lift indicator (638). Adjustment of the lift indicator (640), the identified lift point (638), or both, from the plan view may cause the lift arm to perform a rotation correction or an extension correction to better position the lift arm and adapter for safe engagement with the lift point. Also similar to prior examples, where a lift point integrity issue is determined (e.g., where the lift point cannot be identified due to damage or obfuscation) the user may be warned and presented with options for selecting a different lift point, cleaning and reevaluating the lift point, or overriding the warning.

After confirmation (560), in either case, the plan view dataset may be updated (566) and provided (568) to the identification server (100), to be stored or otherwise integrated with the lift point dataset (103) for inclusion in future plan view datasets. In this manner, multiple users of the lift automation system (10) may, by either confirming automatic identification and positioning or correcting automatic identification and positioning, provide feedback to the lift point dataset (103) that may be used to grow, improve, and refine the lift point dataset (103) and image analysis over time, such as by refining models and other data in an AI/ML image analysis subsystem, resulting in faster and more accurate identification of lift points plan view. After confirming (560), in either case, the system may set (570) the plan view lift point for that lift arm.

With all four arms positioned automatically or semi-automatically as has been described, a vehicle lift such as the lift system (114) or the vehicle lift (200) may enable (410) full operation of the lift, including operation of lift posts to raise the vehicle and allow access to the underside.

IV. Exemplary Vehicle Guide Interface

Figure 32:
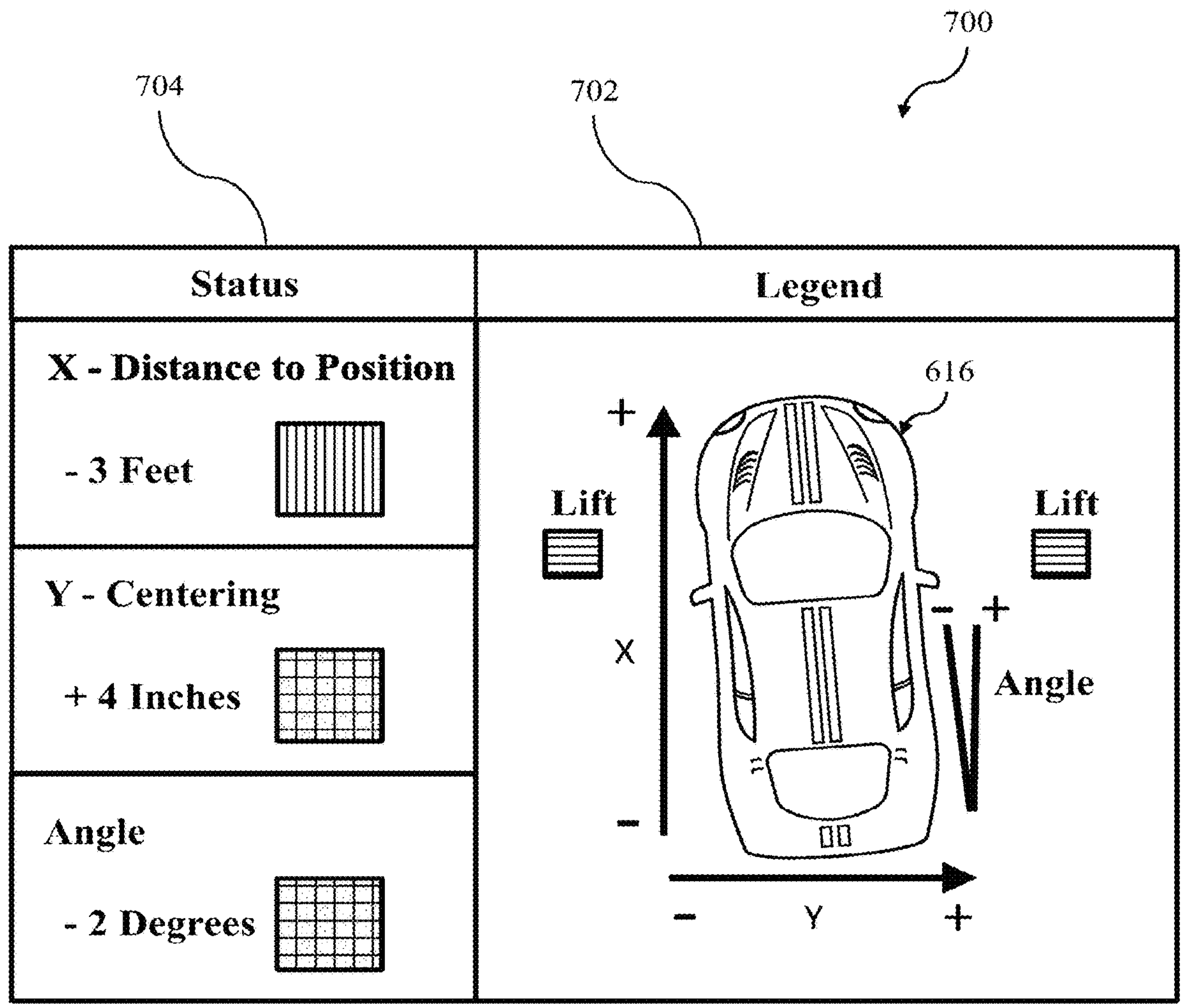
FIG. 32 is a simulated screenshot of a vehicle guide that may be displayed on a user device, where fill patterns indicate red, yellow, and blue regions.

As will be apparent to one of ordinary skill in the art in light of this disclosure, developing the virtualized view (600) allows implementation of other features beyond automation of lift arms and other aspects described above. For example, FIG. 32 shows a simulated screenshot of a vehicle guide interface (700) that may be displayed on a user device such as the lift monitor device (110), and that may be usable to aid in the positioning of a vehicle within the lift area. As can be seen, the vehicle guide interface (700) comprises a legend window that shows information similar to the virtualized view (e.g., position of lift posts, position of vehicle with respect to the x-direction, y-direction, and rotation or orientation) that may be advantageous in allowing a user who is positioning the vehicle within the lift area to more efficiently and accurately reposition the vehicle if needed.

The vehicle guide interface (700) also comprises a status window (704) that shows other information associated with the virtualized view (600). This may include, for example, an x-direction offset from an ideal x-direction position as a number (e.g., 3 feet short of the ideal x-position indicating a need to pull the vehicle further forward) or color (e.g., red, yellow, or green to indicate how close to ideal the vehicle is), a y-direction offset providing similar information, and an orientation or rotation offset providing an indication of whether the vehicle needs to be re-oriented between the lift posts. Ideal positions for x-direction, y-direction, and orientation may be configured manually, or may be automatically determined based upon available information such as the vehicle's overall length, width, weight, the lift point map (606), and other information, as will be apparent to one of ordinary skill in the art in light of this disclosure. Such information may be provided by manufacturers, or it may be determined based upon data collected from a distributed network of sensors, as has been described herein, and may be associated with particular models of vehicles, by VIN number, or by other unique or semi unique associations.

In variations of these embodiments, data created and/or used by the various systems and subsystems is stored in a network-accessible database, local database, virtual database, distributed database, cloud storage, flat file, or other object or device having the capability to receive, organize, store, and retrieve data. The data stored is more or less normalized, redundant, backed up, distributed, encrypted, and anonymized as will occur to those skilled in the art in view of the present disclosure.

Likewise, in variations of these embodiments, the determination of the location and orientation of the vehicle (616) in the vehicle area (118) takes a wide variety of forms as a function of design constraints and preferences. For example, the position and orientation of the vehicle (616) might be determined based on a single post-to-wheel distance measurement (e.g., distance (625)), a measured angle (e.g., angle (623)), and the known distance between the two wheels. Other calculations might take into account distance measurements, angle measurements, and/or video or sensor analysis, whether from each post (612, 614) or from other locations in or near the vehicle area (118) as will occur to those skilled in the art.

V. Exemplary Combinations

The following examples relate to various non-exhaustive ways in which the teachings herein may be combined or applied. It should be understood that the following examples are not intended to restrict the coverage of any claims that may be presented at any time in this application or in subsequent filings related to this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A vehicle lift operable to lift a vehicle within a lift area, the vehicle lift comprising: a lift post that is operable to raise and lower a lift arm assembly; a set of lift arms, wherein each arm of the set of lift arms is attached to the lift post by a post connection at a proximal end of the lift arm, and wherein the system is operable to automatically position a distal end of the lift arm; a set of lift area detectors operable to determine physical characteristics of objects in the lift area; and a lift controller configured to: access an identification dataset that comprises data usable during image analysis to identify objects within an image; control the position of the distal end of each lift arm in the set of lift arms; using information from the set of lift area detectors, determine a virtualized position of the vehicle within the lift area; using the set of lift area detectors, capture a set of one or more images of each lift point in a set of one or more lift points on the vehicle; perform an image analysis on the set of images using the identification dataset to produce a set of results; and automatically position the distal end of each lift arm of the set of lift arms at a different lift point of the set of lift points based on the virtualized position of the vehicle and the set of results.

Example 2

The vehicle lift of example 1, wherein the lift controller is configured to, when determining the virtualized position of the vehicle: capture an image of the vehicle using a camera in the set of lift area detectors; perform an image analysis on the image using the identification dataset to identify a position of a first target point in the image; determine a position of the vehicle in a first dimension and in a second dimension as a function of the location of the first target point within the image, a distance between the first target point on the vehicle and a first proximity sensor in the set of lift area detectors, and an angle of the proximity sensor relative to the first target point; and determine an orientation of the vehicle within the lift area as a function of the position in the first dimension and output from a second proximity sensor of the set of lift area detectors.

Example 3

The vehicle lift of any one or more of examples 1 through 2 wherein the lift controller is further configured to provide an identification dataset update to a site server, where the identification dataset update comprises information from the set of lift area detectors.

Example 4

The vehicle lift of example 3, wherein the lift controller is further configured to receive a new identification dataset from the identification server, wherein the new identification dataset is configured based at least in part upon the identification dataset update.

Example 5

The vehicle lift of any one or more of examples 1 through 4, wherein the lift controller is configured to, when performing the image analysis: capture a profile view image of the vehicle and perform a profile image analysis on the profile view image using the identification dataset to identify a lift point within the profile view image; and determine whether the lift point within the profile view image is contained within a target envelope of the lift arm, and cause a lift monitor device to display the profile view image, the lift point, and the target envelope.

Example 6

The vehicle lift of example 5, wherein the lift controller is further configured to: receive a confirmation from the lift monitor device indicating that the lift point is positioned within the target envelope; create an identification dataset update comprising the profile view image and the lift point; and provide the identification dataset update to an identification server.

Example 7

The vehicle lift of any one or more of examples 1 through 6, wherein the lift controller is configured to, when performing the image analysis: capture a plan view image of the vehicle and perform a plan view image analysis on the plan view image using the identification dataset to identify a lift point within the plan view image; and determine whether the lift point within the plan view image is contained within a target envelope of the lift arm, and cause a lift monitor device to display the plan view image, the lift point, and the target envelope.

Example 8

The vehicle lift of example 7, wherein the lift controller is further configured to: receive a confirmation from the lift monitor device indicating that the lift point is positioned within the target envelope; create an identification dataset update comprising the plan view image and the lift point; and provide the identification dataset update to the identification server.

Example 9

The vehicle lift of any one or more of examples 1 through 8, wherein the lift controller is further configured to: for each lift arm of the set of lift arms, cause a lift monitor device to display a plan view image of a lift point above an adapter of that lift point; receive a confirmation from the lift monitor device indicating that the set of lift arms is correctly positioned; create an identification dataset update comprising each plan view image and an identified lift point within each plan view image; and provide the identification dataset update to an identification server.

Example 10

The vehicle lift of example 9, wherein the lift controller is further configured to receive a new identification dataset from the identification server, and wherein the new identification dataset is based at least in part upon the identification dataset update.

Example 11

A system for lifting a vehicle in a lift area, comprising: a vehicle lift comprising a lift post; a set of lift area detectors operable to determine characteristics of the lift area, the set of lift area detectors comprising a camera, a first proximity sensor, and a second proximity sensor; a lift controller, wherein the lift controller is configured to: capture an image of the vehicle using the camera and perform a target point image analysis on the image using the identification dataset to identify a location of a first target point within the image; determine a first relative position of the vehicle as a function of the location of the first target point within the image, wherein the first relative position describes a first coordinate position of the vehicle in the lift area; determine a first distance between a second target point on the vehicle and the proximity sensor; determine a second relative position of the vehicle as a function of the first distance, the first relative position, and an angle of the proximity sensor relative to the second target object, wherein the second relative position describes a second coordinate position of the vehicle in the lift area; determine an orientation of the vehicle within the lift area as a function of the first distance and a second distance, wherein the second distance describes the distance between a third target point on the vehicle and the second proximity sensor; and cause a vehicle guide to be displayed on a lift monitor device, wherein the vehicle guide comprises: a legend showing a representation of the vehicle in a representation of the lift area indicating the first relative position, the second relative position, and the orientation; an x-direction offset indicating the difference between the first relative position and an ideal x-direction position; a y-direction offset indicating the difference between the second relative position and an ideal y-direction position; and an angle offset indicating the difference between the orientation and an ideal orientation.

Example 12

The system of example 11, wherein the lift controller is further configured to: associate the virtualized position of the vehicle with a lift point map, wherein the lift point map describes the positions of the set of lift points on the vehicle; and for each lift arm in of the set of lift arms, select a usable lift point as a function of the virtualized position of the vehicle and the lift point map.

Example 13

The system of example 12, wherein each lift arm in the set of lift arms comprises an adapter; and the set of lift area detectors comprises a profile camera positioned on each of the set of lift arms exterior to the adapter, and wherein the lift controller is further configured to: operate a selected lift arm in the set of lift arms to position the selected lift arm to provide the profile camera on the selected lift arm with a profile view of the lift point; capture a profile view image of the lift point; perform a profile image analysis on the profile view image using the identification dataset to identify the lift point within the profile view image; determine whether the lift point within the profile view image is contained within a target envelope of the lift arm; and if the lift point within the profile view image is determined not to be within the target envelope of the lift arm, reposition the lift arm until the lift point within the profile view image is within the target envelope.

Example 14

The system of any one or more of examples 11 through 13, wherein the set of lift area detectors comprises an adapter camera positioned within the adapter of each lift arm in the set of lift arms such that the adapter camera's field of view is upwards through an aperture of the adapter, and wherein the lift controller is further configured to: operate the lift arm to position the lift arm below the lift point and provide the adapter camera with a plan view of the lift point; capture a plan view image of the lift point and perform a plan view image analysis on the plan view image using the identification dataset to identify the lift point within the plan view image; determine whether the lift point within the plan view image is contained within a target envelope of the lift arm; and if the lift point within the plan view image is determined not to be within the target envelope of the lift arm, reposition the lift arm until the lift point within the plan view image is within the target envelope.

Example 15

A lift automation system comprising: an identification server; an image dataset that is stored and accessible by the identification server; an identification dataset that is stored and accessible by the identification server, wherein the identification dataset is configured to be used during image analysis to identify objects within an image; wherein the identification server is in communication with a plurality of user sites, each user site configured to control a vehicle lift as a function of an identification data set, and wherein the identification server is configured to: perform an image analysis on the image dataset to produce a set of results that identify a set of objects within the image dataset; create the identification dataset as a function of the image dataset and the set of results; provide the identification dataset to a first user site of the plurality of user sites; receive a positive identification from the first user site, wherein the positive identification comprises an image and a positive image descriptor associated with the image, wherein the positive image descriptor indicates the presence of an object of the set of objects within the image; update the image dataset as a function of the positive identification; after updating the image dataset, update the identification dataset as a function of the image dataset; and after updating the identification dataset, provide the identification dataset to the plurality of user sites.

Example 16

The lift automation system of example 15, wherein: the image dataset comprises a wheel image dataset and the image is a wheel image; and the identification dataset is configured to be usable during image analysis to identify wheels within an image.

Example 17

The lift automation system of any one or more of examples 15 through 16, wherein: the image dataset comprises a lift point profile view image dataset and the image is a lift point profile view image; and the identification dataset is configured to be usable during image analysis to identify lift points from a profile view within an image.

Example 18

The lift automation system of any one or more of examples 15 through 17, wherein: the image dataset comprises a lift point plan view image dataset and the image is a lift point plan view image; and the identification dataset is configured to be usable during image analysis to identify lift points from a plan view within an image.

Example 19

The lift automation system of any one or more of examples 15 through 18, wherein: the image dataset comprises wheel image dataset, a lift point profile view image dataset, and a lift point plan view image dataset; and the identification dataset is configured to be usable during image analysis to identify wheels and lift points from a profile view, and lift points from a plan view within an image.

Example 20

A vehicle lift arm comprising: an inner arm positioned within an outer arm, the outer arm comprising a post connection positioned at a proximate end of the outer arm and adapted to attach the outer arm to a lift post, a rotation motor assembly operable to cause the outer arm to rotate about the post connection, wherein the post connection is statically fixed to the lift post; an extension motor assembly operable to cause the inner arm to extend outwards from the outer arm; an inner arm vertical extension positioned at a distal end of the inner arm, the inner arm vertical extension comprising an actuator and an adapter assembly, wherein the actuator is operable to cause the adapter assembly to raise to an elevated position from a neutral position; and the adapter assembly comprising an adapter and an adapter receiver, wherein the adapter and the adapter receiver, when assembled, form a camera receiver that is configured to receive and hold an adapter camera such that a lens of the adapter camera faces upwards through an adapter aperture in the surface of the adapter.

Example 21

The vehicle lift arm of example 20, wherein the adapter comprises a threading that allows it to be unscrewed from the adapter receiver, and wherein the adapter camera is statically fixed to the adapter receiver such that it does not rotate when the adapter is removed.

Example 22

An intelligent lift automation system comprising: an identification server; a network of sensors distributed across a plurality of user sites, wherein each sensor of the network of sensors is positioned in or proximate to a vehicle's position at the user site that comprises a respective vehicle lift; wherein the identification server is in communication with the plurality of user sites, and wherein the identification server is configured to: perform an image analysis on the image dataset to produce a set of results that identify a set of objects within the image dataset; create an identification dataset as a function of the image dataset and the set of results, wherein the identification dataset is configured to be used during image analysis to identify objects within an image; provide the identification dataset to the user site; receive a set of sensor data from the user site, wherein the set of sensor data is produced by one or more sensors in the network of sensors located at the user site; receive a positive identification from the user site, wherein the positive identification comprises an image of a set of objects and a positive image descriptor associated with the image, and wherein the positive image descriptor indicates the presence of an object of the set of objects within the image; update the image dataset as a function of the positive identification and the set of sensor data; after updating the image dataset, update the identification dataset as a function of the image dataset; and after updating the identification dataset, provide the identification dataset to the plurality of user sites.

Example 23

The intelligent lift automation system of example 22, wherein the plurality of vehicle lifts comprise two or more of: a two-post lift; an in-ground lift;

a set of rolling jacks; a set of mobile lift posts; and a vehicle carrier.

Example 24

An intelligent lift automation system comprising: a lift situated in a lift area; one or more detectors, the detectors together being operable to generate: a first set of images useful in determining a position of a vehicle in the lift area and a second set of images useful in determining a position of a set of lift points on the vehicle; and a lift controller configured to: based on the first set of images, virtualize the position of the vehicle relative to the lift; based on the second set of images, associate the virtualized position of the vehicle with a lift point map, wherein the lift point map describes the positions of the set of lift points on the vehicle; generate a positive identification that comprises at least one image from the second set of images and a positive image descriptor associated with the at least one image, where the positive image descriptor indicates the presence of a valid lift point in the at least one image; and control one or more movements of the lift to engage the valid lift point.

Example 25

A lift for a vehicle, comprising: a vehicle carrier comprising one or more vehicle-engaging adapters; one or more cameras positioned on the vehicle carrier directed toward a field of view substantially directly above the adapters; and a lift controller in communication with the one or more cameras, wherein the lift controller is configured to: display an image from the camera on a user interface; call out a target area within the image, the target area corresponding to a desired alignment between one of the vehicle-engaging adapters and a lift point on the vehicle; prompt a user via the user interface for a confirmation of the target area; and upon receiving the confirmation, enable movement of the vehicle-engaging adapters to engage the lift point.

Example 26

The lift of example 25, wherein the lift controller is in communication with an identification server, and the lift controller is configured to: create an identification dataset update comprising a record of the displayed image and the confirmation; and provide the identification dataset update to the identification server.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. An arrangement comprising a plurality of user sites and a lift automation system, the lift automation system comprising:

an identification server;

an image dataset that is stored and accessible by the identification server; and an identification dataset that is stored and accessible by the identification server, wherein the identification dataset is configured to be used during image analysis to identify objects within an image;

wherein the identification server is in communication with the plurality of user sites, each user site configured to control a vehicle lift as a function of the identification dataset, and wherein the identification server is configured to:

perform an image analysis on the image dataset to produce a set of results that identify a set of objects within the image dataset;

create the identification dataset as a function of the image dataset and the set of results;

provide the identification dataset to a first user site of the plurality of user sites;

receive a positive identification from the first user site, wherein the positive identification comprises an image and a positive image descriptor associated with the image, wherein the positive image descriptor indicates the presence of an object of the set of objects within the image;

update the image dataset as a function of the positive identification;

after updating the image dataset, update the identification dataset as a function of the image dataset; and after updating the identification dataset, provide the identification dataset to the plurality of user sites.

2. The arrangement of claim 1, wherein:

the image dataset comprises a wheel image dataset and the image is a wheel image; and the identification dataset is configured to be usable during image analysis to identify wheels within the image.

3. The arrangement of claim 1, wherein:

the image dataset comprises a lift point profile view image dataset and the image is a lift point profile view image; and the identification dataset is configured to be usable during image analysis to identify lift points from a profile view within the image.

4. The arrangement of claim 1, wherein:

the image dataset comprises a lift point plan view image dataset and the image is a lift point plan view image; and the identification dataset is configured to be usable during image analysis to identify lift points from a plan view within the image.

5. The arrangement of claim 1, wherein:

the image dataset comprises wheel image dataset, a lift point profile view image dataset, and a lift point plan view image dataset; and the identification dataset is configured to be usable during image analysis to identify wheels and lift points from a profile view, and lift points from a plan view within the image.

6. An arrangement comprising a plurality of user sites and an intelligent lift automation system, the intelligent lift automation system comprising:

a network of sensors distributed across the plurality of user sites, wherein each sensor of the network of sensors is positioned in or proximate to a vehicle's position at the user site that comprises a respective vehicle lift;

an identification server, wherein the identification server is in communication with the plurality of user sites, and wherein the identification server is configured to:

perform an image analysis on an image dataset to produce a set of results that identify a set of objects within the image dataset;

create an identification dataset as a function of the image dataset and the set of results, wherein the identification dataset is configured to be used during image analysis to identify objects within an image;

provide the identification dataset to the user site;

receive a set of sensor data from the user site, wherein the set of sensor data is produced by one or more sensors in the network of sensors located at the user site;

receive a positive identification from the user site, wherein the positive identification comprises an image of a set of objects and a positive image descriptor associated with the image, and wherein the positive image descriptor indicates the presence of an object of the set of objects within the image;

update the image dataset as a function of the positive identification and the set of sensor data;

after updating the image dataset, update the identification dataset as a function of the image dataset; and after updating the identification dataset, provide the identification dataset to the plurality of user sites.

7. The arrangement of claim 6, wherein the plurality of vehicle lifts comprises two or more of:

a two-post lift;

an in-ground lift;

a set of rolling jacks;

a set of mobile lift posts; and a vehicle carrier.

8. The arrangement of claim 6, wherein the set of sensor data comprises information about the dimensions and spatial characteristics of the vehicle.

9. The arrangement of claim 8, wherein the identification server is further configured to:

create one or more informational datasets based on the set of sensor data; and provide at least one of the one or more informational datasets to the user site.

10. A method for positioning a lift arm to a vehicle lift point of a vehicle at a user site, the user site comprising a site server in communication with a lift automation system, the lift automation system comprising an identification server, the method comprising:

receiving, at the site server, a lift point map and a profile dataset, the lift point map comprising one or more lift point locations associated with the vehicle;

associating the lift point map with a virtualized view of a vehicle lift area at the user site and the vehicle;

selecting the vehicle lift point from the lift point map, wherein the vehicle lift point is associated to one of the one or more lift point locations associated with the vehicle and the vehicle lift point can be reached by the lift arm;

positioning the lift arm in proximity to the usable lift point location;

capturing a lift point profile view image dataset with a camera, the lift arm comprising the camera;

performing an image analysis on the lift point profile view image dataset to identify the vehicle lift point on the vehicle;

receiving a confirmation that the lift arm is at the vehicle lift point; and engaging, automatically, the lift arm to the vehicle lift point.

11. The method of claim 10, further comprising:

updating the profile dataset based on the confirmation; and sending, after updating the profile dataset, the profile dataset to the identification server.

12. The method of claim 11, wherein sending the profile dataset to the identification server includes sending one or more of:

the lift point profile view image dataset;

analysis rules;

algorithms; and heuristics.

13. The method of claim 10, wherein the profile dataset comprises information describing vehicle lift points and characteristics of vehicle lift points.

14. The method of claim 13, wherein the information describing vehicle lift points and characteristics of vehicle lift points comprises:

image sets showing a plurality of side profile views, wherein each of the plurality of side profile views varies in one or more visual characteristics of vehicle lift points; and sets of metadata associated with the image sets.

15. The method of claim 14, wherein the sets of metadata indicate, for each image of the image sets, or for sets of images from the image sets, one or more of:

a positive identification of a lift point;

an area indicating the position of the lift point; and data associated with the circumstances in which each image, or set of images, was captured.

16. The method of claim 10, wherein selecting the vehicle lift point from the lift point map is based on at least one of:

a preference;

a mechanical limit of the lift arm;

a manufacturer preference; and a manual selection by a user.

17. The method of claim 16, wherein the preference is that between an inner lift point and an outer lift point.

18. The method of claim 10, wherein performing the image analysis on the lift point profile view image dataset to identify the vehicle lift point on the vehicle further comprises sending the vehicle lift point to a display device.

19. The method of claim 18, wherein the user site further comprises a lift monitor device and the display device is the lift monitor device.

20. The method of claim 18, wherein the vehicle lift point is visually indicated on the display device by one of a box, a circle, an overlay, and a highlight.

* * * * *